United States Patent
Zhang et al.

(10) Patent No.: US 8,989,140 B2
(45) Date of Patent: Mar. 24, 2015

(54) SYSTEM AND METHOD FOR MOBILITY IN A MULTI-POINT HSDPA COMMUNICATION NETWORK

(75) Inventors: Danlu Zhang, San Diego, CA (US); Sharad Deepak Sambhwani, San Diego, CA (US); Rohit Kapoor, San Diego, CA (US); Jilei Hou, San Diego, CA (US); Weiyan Ge, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 13/170,083

(22) Filed: Jun. 27, 2011

(65) Prior Publication Data

US 2012/0163338 A1 Jun. 28, 2012

Related U.S. Application Data

(60) Provisional application No. 61/359,326, filed on Jun. 28, 2010, provisional application No. 61/374,212, filed on Aug. 16, 2010, provisional application No. 61/477,776, filed on Apr. 21, 2011, provisional application No. 61/483,020, filed on May 5, 2011.

(51) Int. Cl.
*H04W 4/00* (2009.01)
*H04W 36/00* (2009.01)
*H04W 76/02* (2009.01)

(52) U.S. Cl.
CPC ........ *H04W 36/0083* (2013.01); *H04W 76/025* (2013.01)
USPC .......................................................... 370/331

(58) Field of Classification Search
CPC .................................................. H04W 72/1278
USPC .................................. 370/329, 331; 455/515
See application file for complete search history.

(56) References Cited

U.S. PATENT DOCUMENTS 7,242,670 B2 7/2007 Yi et al.
7,551,596 B2 6/2009 Kim et al.
(Continued)

FOREIGN PATENT DOCUMENTS

CN 101720562 A 6/2010
EP 1284583 A2 2/2003
(Continued)

OTHER PUBLICATIONS

Anand J, et al: "Architecture, implementation, and evaluation of a concurrent multi-path real-time transport control protocol," Military Communications Conference, 2007. MILCOM 2007. IEEE. IEEE, Piscataway, NJ, USA, Oct. 29, 2007, pp. 1-7, XP031232821, Introduction sections II.A and II.B.

(Continued)

*Primary Examiner* — Wei Zhao
(74) *Attorney, Agent, or Firm* — Darren M. Simon

(57) ABSTRACT

A method and apparatus for wireless communication may provide for mobility in a Multi-Point HSDPA network capable of downlink aggregation. Some aspects of the disclosure provide modified mobility events utilized for altering the Active Set for a UE. Here, the addition of a cell to the Active Set can coincide with making that cell a secondary serving cell. Further, the deletion of a secondary serving cell from the Active Set can coincide with switching off the Multi-Point HSDPA mode. Still further, a modified mobility event for an HSDPA serving cell change can be utilized to swap a primary serving cell and a secondary serving cell.

72 Claims, 17 Drawing Sheets

(56) References Cited

U.S. PATENT DOCUMENTS

| | | |
|---|---|---|
| 7,710,922 B2 | 5/2010 | Lundh et al. |
| 7,729,349 B2 | 6/2010 | Beckmann et al. |
| 7,864,722 B2 | 1/2011 | Yi et al. |
| 7,903,578 B2 | 3/2011 | Fischer |
| 7,944,943 B2 | 5/2011 | Kekki et al. |
| 7,961,704 B2 | 6/2011 | Meyer et al. |
| 8,068,473 B2 | 11/2011 | Chun et al. |
| 8,068,497 B2 | 11/2011 | Terry et al. |
| 8,094,618 B2 | 1/2012 | Yi et al. |
| 8,144,662 B2 | 3/2012 | Xing et al. |
| 8,638,773 B2 | 1/2014 | Ho et al. |
| 2002/0021714 A1 | 2/2002 | Seguin |
| 2003/0129982 A1 | 7/2003 | Perini |
| 2003/0171118 A1 | 9/2003 | Miya |
| 2003/0198204 A1 | 10/2003 | Taneja et al. |
| 2004/0013089 A1 | 1/2004 | Taneja et al. |
| 2004/0224691 A1 | 11/2004 | Hadad |
| 2005/0044130 A1 | 2/2005 | Sillasto et al. |
| 2005/0074024 A1 | 4/2005 | Kim et al. |
| 2006/0033323 A1 | 2/2006 | Reynolds |
| 2006/0126507 A1 | 6/2006 | Nakayasu |
| 2006/0203760 A1 | 9/2006 | Fukui et al. |
| 2006/0274712 A1 | 12/2006 | Malladi et al. |
| 2006/0276214 A1 | 12/2006 | Harris et al. |
| 2007/0008990 A1 | 1/2007 | Torsner |
| 2007/0104150 A1 | 5/2007 | Fernandez-Corbaton et al. |
| 2008/0069043 A1 | 3/2008 | Kimura et al. |
| 2008/0132263 A1* | 6/2008 | Yu et al. .......................... 455/515 |
| 2008/0225789 A1 | 9/2008 | Kim et al. |
| 2008/0298322 A1 | 12/2008 | Chun et al. |
| 2008/0298332 A1 | 12/2008 | Erami |
| 2009/0010213 A1* | 1/2009 | Yamada et al. ............... 370/329 |
| 2009/0036061 A1 | 2/2009 | Chun et al. |
| 2009/0041001 A1 | 2/2009 | Lee et al. |
| 2009/0103445 A1 | 4/2009 | Sammour et al. |
| 2009/0193310 A1 | 7/2009 | Hashimoto |
| 2009/0213729 A1 | 8/2009 | Zhang et al. |
| 2009/0219881 A1 | 9/2009 | Kim |
| 2009/0245178 A1 | 10/2009 | Gholmieh et al. |
| 2009/0245212 A1 | 10/2009 | Sambhwani et al. |
| 2009/0257387 A1 | 10/2009 | Gholmieh et al. |
| 2009/0270103 A1 | 10/2009 | Pani et al. |
| 2009/0296643 A1 | 12/2009 | Cave et al. |
| 2009/0296798 A1 | 12/2009 | Banna et al. |
| 2009/0300456 A1 | 12/2009 | Pelletier et al. |
| 2009/0310534 A1 | 12/2009 | Lindskog et al. |
| 2009/0323639 A1 | 12/2009 | Kim et al. |
| 2009/0327830 A1 | 12/2009 | Lee et al. |
| 2010/0002645 A1 | 1/2010 | Ke et al. |
| 2010/0034087 A1 | 2/2010 | De Benedittis et al. |
| 2010/0034114 A1 | 2/2010 | Kim et al. |
| 2010/0034169 A1 | 2/2010 | Maheshwari et al. |
| 2010/0034171 A1 | 2/2010 | Pelletier et al. |
| 2010/0034176 A1 | 2/2010 | Heo et al. |
| 2010/0067483 A1 | 3/2010 | Ahluwalia |
| 2010/0110985 A1 | 5/2010 | Umesh et al. |
| 2010/0118723 A1 | 5/2010 | Pani et al. |
| 2010/0130137 A1 | 5/2010 | Pelletier et al. |
| 2010/0165830 A1 | 7/2010 | Amir et al. |
| 2010/0222059 A1 | 9/2010 | Pani et al. |
| 2010/0233962 A1* | 9/2010 | Johansson et al. ........... 455/63.1 |
| 2010/0238803 A1 | 9/2010 | Racz et al. |
| 2010/0238829 A1 | 9/2010 | Sambhwani et al. |
| 2010/0265883 A1 | 10/2010 | Attar et al. |
| 2010/0296511 A1 | 11/2010 | Prodan et al. |
| 2010/0303054 A1 | 12/2010 | Yang et al. |
| 2011/0038313 A1 | 2/2011 | Park et al. |
| 2011/0044168 A1 | 2/2011 | Nadas et al. |
| 2011/0044297 A1 | 2/2011 | Lee et al. |
| 2011/0122962 A1 | 5/2011 | De Pasquale et al. |
| 2011/0164560 A1 | 7/2011 | Ki et al. |
| 2011/0170495 A1 | 7/2011 | Earnshaw et al. |
| 2011/0222502 A1* | 9/2011 | Aminaka ..................... 370/329 |
| 2011/0228756 A1 | 9/2011 | Kim et al. |
| 2011/0235519 A1 | 9/2011 | Racz et al. |
| 2011/0235528 A1 | 9/2011 | Racz et al. |
| 2011/0317642 A1 | 12/2011 | Eravelli et al. |
| 2011/0317657 A1 | 12/2011 | Chmiel et al. |
| 2012/0039169 A1 | 2/2012 | Susitaival et al. |
| 2012/0057560 A1 | 3/2012 | Park et al. |
| 2012/0082096 A1 | 4/2012 | Cave et al. |
| 2012/0163161 A1 | 6/2012 | Zhang et al. |
| 2012/0163205 A1 | 6/2012 | Zhang et al. |
| 2012/0163315 A1 | 6/2012 | Govindappa et al. |
| 2012/0201219 A1 | 8/2012 | Wager et al. |
| 2012/0201226 A1 | 8/2012 | Sambhwani et al. |
| 2012/0281564 A1 | 11/2012 | Zhang et al. |
| 2012/0320867 A1 | 12/2012 | Sarkkinen et al. |
| 2013/0016841 A1 | 1/2013 | Fong et al. |
| 2013/0121247 A1 | 5/2013 | Seo et al. |
| 2013/0155923 A1 | 6/2013 | Yi et al. |
| 2013/0194921 A1 | 8/2013 | Zhang et al. |
| 2013/0194924 A1 | 8/2013 | Zhang et al. |
| 2014/0056238 A1 | 2/2014 | Nammi et al. |
| 2014/0112255 A1 | 4/2014 | Kim et al. |
| 2014/0153520 A1 | 6/2014 | Shinohara et al. |

FOREIGN PATENT DOCUMENTS

| | | |
|---|---|---|
| EP | 1523134 A1 | 4/2005 |
| EP | 1672845 A1 | 6/2006 |
| EP | 1675426 A2 | 6/2006 |
| EP | 1773009 A2 | 4/2007 |
| EP | 1868394 A1 | 12/2007 |
| EP | 1950903 A1 | 7/2008 |
| EP | 2015526 A2 | 1/2009 |
| JP | 2005304060 A | 10/2005 |
| JP | 2008053851 A | 3/2008 |
| JP | 2010028714 A | 2/2010 |
| JP | 2010515357 A | 5/2010 |
| JP | 2010530197 A | 9/2010 |
| JP | 2011525336 A | 9/2011 |
| JP | 2013543706 A | 12/2013 |
| WO | 0230144 A1 | 4/2002 |
| WO | 03017711 A1 | 2/2003 |
| WO | 2005041493 A1 | 5/2005 |
| WO | 2006103136 A1 | 10/2006 |
| WO | 2007050238 A1 | 5/2007 |
| WO | 2008085351 A1 | 7/2008 |
| WO | 2008097544 A2 | 8/2008 |
| WO | 2008156268 A2 | 12/2008 |
| WO | WO-2009108808 | 9/2009 |
| WO | 2009155480 A1 | 12/2009 |
| WO | 2010064365 A1 | 6/2010 |
| WO | 2010088538 | 8/2010 |
| WO | 2010106663 A1 | 9/2010 |
| WO | 2010125738 A1 | 11/2010 |
| WO | 2010132186 A1 | 11/2010 |

OTHER PUBLICATIONS

Dong, Yu, et al: "A concurrent transmission control protocol," Communications, Circuits, and Systems Proceedings, 2006 International Conference on, IEEE, PI, Jun. 1, 2006, pp. 1796-1800, XP031010769, abstract, section II.

ETSI: "Digital cellular telecommunications system (Phase 2+); General Packet Radio Service (GPRS); Mobile Station (MS)—Base Station System (BSS) interface; Radio Link Control/ Medium Access Control (RLC/MAC) protocol (GSM 04.60 proposed version 1.1.0)", GSM 04.60, Feb. 19, 1998, pp. 48-51, XP000002657121, Retrieved from the Internet: URL:ww.etsi.org [retrieved on Aug. 18, 2011].

International Search Report and Written Opinion—PCT/US2011/042247, ISA/EPO—Aug. 30, 2011.

Catt: "Implicit Feedback in Support of Downlink CoMP", 3GPP Draft; R1-093522, 3rd Generation Partnership Project (3GPP), Mobile Competence Centre ; 650, Route Des Lucioles ; F-06921 Sophia-Antipolis Cedex ; France, no. Shenzhen, China; 20090819, Aug. 19, 2009, XP050351782,[retrieved on Aug. 19, 2009] paragraphs 2.1 to 2.2.

Catt: "Measurement in CA", 3GPP Draft; R2-095485, 3rd Generation Partnership Project (3GPP), Mobile Competence Centre ; 650, Route Des Lucioles ; F-06921 Sophia-Antipolis Cedex ; France, no.

(56) References Cited

OTHER PUBLICATIONS

Miyazaki; 20091012, Oct. 16, 2009, XP050390041, [retrieved on Oct. 4, 2009] paragraphs [02.2], [02.3].
David Soldani et al: "Strategies for Mobile Broadband Growth: Traffic Segmentation for Better Customer Experience", Vehicular Technology Conference (VTC Spring), 2011 IEEE 73rd, IEEE, May 15, 2011, pp. 1-5, XP031896606, DOI : 10.1109/VETECS.2011.5956203 ISBN: 978-1-4244-8332-7.
Ericsson: "Iub and Iur Congestion Control Concept for HSUPA and HSDPA", 3GPP Draft; R3-050545 Iubiur Cong Ctrl Disc, 3rd Generation Partnership Project (3GPP), Mobile Competence Centre ; 650, Route Des Lucioles ; F-06921 Sophia-Antipolis Cedex ; France, vol. Ran WG3, no. Athens, Greece; 20050504, May 4, 2005, XP050157970, [retrieved on May 4, 2005].
International Search Report and Written Opinion—PCT/US2011/042250—ISA/EPO—Nov. 11, 2011.
MCC Support: "Final Report of 3GPP TSG RAN WG1 #56bis v2.0.0 (Seoul, South Korea, 23 Mar. 27, 2009)",3GPP Draft; FinalReportWG1#56B-V200, 3rd Generation Partnership Project (3GPP), Mobile Competence Centre ; 650, Route Des Lucioles ; F-06921 Sophia-Antipolis Cedex France, San Francisco, USA; 20090505, May 5, 2009, XP050339215,[ retrived on May 5, 2009] p. 11-p. 13-p. 14 p. 43-p. 44 p. 54-p. 55.
Nadas et al., "Providing Congestion Control in the Iub Transport Network for HSDPA," Global Telecommunications Conference 2007, Ericsson Research, GLOBECOM '07, IEEE, Nov. 26-30, 2007, 5 pages.
Nokia: "Number of Control Symbols", 3GPP Draft; R2-071227 Number of Control Symbols, 3rd Generation Partnership Project (3GPP), Mobile Competence Centre ; 650, Route Des Lucioles ; F-06921 Sophia-Anti Polis Cedex ; France, vol. RAN WG2, no. St. Juliana s, Malta; 20070326-200703, Mar. 22, 2007, XP050602966, [retrieved on Mar. 22, 2007].
Nokia Siemens Networks et al: "Multi-cell transmission techniques for HSDPA", 3GPP Draft; R1-104913, 3rd Generation Partnership Project (3GPP), Mobile Competence Centre ; 650, Route Des Lucioles ; F-06921 Sophia-Antipolis Cedex ; France, vol . RAN WG1, no. Madrid, Spain; 20100823, Aug. 17, 2010, XP050450059, [retrieved on Aug. 17, 2010] paragraphs [003.], [03.5], [04.1].
Qualcomm Europe: "TP for feedback in support of DL CoMP for LTEA TR", 3GPP Draft; R1-092290 TP for TR 36.814 on DL Comp Feedback, 3rd Generation Partnership Project (3GPP), Mobile Competence Centre ; 650, Route Des Lucioles ; F-06921 Sophia-Antipolis Cedex; France, no. San Francisco, USA; 20090609, Jun. 9, 2009 XP050339699, [retrieved on Jun. 9, 2009].
Qualcomm Incorporated: "DL Scheduling, RLC and Flow Control assumption for Inter-NodeB Multi-Point Transmissions", 3GPP Draft; R1-110126_DL_SCH_RLC_Flow_Control_ASS_InterNodeB_MP-HSDPA, 3rd Generation Partnership Project (3GPP), Mobile Competence Centre ; 650, Route Des Lucioles ; F-06921 Sophia-Antipolis Cedex ;France, vol. RAN WG1, no. Dublin, Ireland; 20110117, Jan. 11, 2011, XP050474375.
Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol. RAN-WG1, no. Dresden, Germany; 20100629 Jul. 5, 2010, XP002633072, Retrieved from the Internet: URL:http://www.3gpp.org/ftp/tsg_ran/WG1_RL1/TSGR1_61b/Docs/R1-104157.zip [retrieved on Apr. 14, 2011] .
Qualcomm Incorporated: "On Inter-site Multi-Point Transmission in HSDPA", 3GPP Draft; R2-115196 on Inter-Site Multi-Point Transmisston in HSDPA, 3rd Generation Partnership Project (3GPP) , Mobile Competence Centre ; 650, Route Des Lucioles ; F-06921 Sophia-Antipolis Cedex ; France, vol. RAN WG2, no. Zhuhai; 20111010, Oct. 4, 2011, XP050540985, [retrieved on Oct. 4, 2011] paragraphs [02.3] , [0003] figure 2; table 1.
Qualcomm Incorporated: "TCP Performance Evaluation of SF-DC Inter NodeB Aggregation Assuming Realistic RLC, Flow Control and Iub Congestions Control", 3GPP Draft; R1-112686_TCP_Perf_Eval_SF_DC_Inter_NodeB_Realistic_RLC_FC_CC,
3rd Generation Partnership Project (3GPP), Mobi le Competence Centre ; 650, Route Des Lucioles ; F-06921 Sophia-Antipolis Cedex ; France, vol. RAN WG1, no. Athens, Greece; 20110822, Aug. 16, 2011, XP050537724, [retrieved on Aug. 16, 2011].
Samsung: "Selection of primary scheduling Node B in SHO", 3GPP Draft; R1-040492, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; 20040506, May 6, 2004, XP050098858.
Sharp, "Simultaneous Retransmission of Different Redundancy Versions during the HARQ for DL CoMP," 3GPP TSG-RAN WG1#58Bis, R1-094026, Miyazaki, Japan, Oct. 12-16, 2009, pp. 1-3.
Vulkan et al., "Congestion Control in Evolved HSPA Systems," 2011 IEEE 73rd Vehicular Technology Conference (VTC Spring), pp. 1-6.
GSM: "Digital cellular telecommunications system (Phase 2+), General Packet Radio Service (GPRS), Mobile Station (MS)—Base Station System (BSS) interface, Radio Link Control/ Medium Access Control (RLC/MAC) protocol (GSM 04.60 proposed version 6.1.0, Release 1997)", Draft EN 301 349 V6.1.0 (Aug. 1998), pp. 1-152.
Qualcomm Incorporated: "On deploying DC-HSDPA UEs in Single Frequency Networks", 3GPP TSG-RAN WG1#61b R1-103859, Jun. 21, 2010, pp. 1-14.
Sandrasegaran K., et al., "Delay-Prioritized Scheduling (DPS) for Real Time Traffic in 3GPP LTE System", IEEE Wireless Communications and Networking Conference (WCNC), pp. 1-6, 2010.
3GPP., "System performance of SFDC-HSDPA"; R1-106393, 3GPP TSG RAN WG1 Meeting #63; R1-106393; Jacksonville, USA, Nov. 15-19, 2010; pp. 01-07.
Gomes J.S., et al., Integrating Admission Control and Packet Scheduling for Quality Controlled Streaming Services in HSDPA Networks; Broadband Communications, Networks and Systems, pp. 567-573, 2007.
Necker M.C., et al., "Parameter Selection for HSDPA Iub Flow Control," Wireless Communication Systems, 2005. 2nd International Symposium on, vol., no., pp. 233, 237, Sep. 7, 2005 DOI: 10.1109/ISWCS.2005.1547693.

\* cited by examiner

SYSTEM AND METHOD FOR MOBILITY IN A MULTI-POINT HSDPA COMMUNICATION NETWORK

CROSS-REFERENCE TO RELATED APPLICATIONS

This application claims priority to and the benefit of provisional patent application No. 61/359,326, filed in the United States Patent and Trademark Office on Jun. 28, 2010; provisional patent application No. 61/374,212, filed in the United States Patent and Trademark Office on Aug. 16, 2010; provisional patent application No. 61/477,776, filed in the United States Patent and Trademark Office on Apr. 21, 2011; and provisional patent application No. 61/483,020 filed in the United States Patent and Trademark Office on May 5, 2011, the entire contents of which are incorporated herein by reference.

BACKGROUND

1. Field

Aspects of the present disclosure relate generally to wireless communication systems, and more particularly, to mobility events in a system configured for downlink for carrier aggregation.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, Multi-Point HSDPA has been recently introduced, in which plural cells can provide high-speed downlink communication to a mobile station, such that the mobile station is capable of aggregating the transmissions from those cells, within the same frequency carrier. As a relatively new system, various issues arise in this system that may not have been addressed in other downlink carrier aggregation systems such as DC-HSDPA. Thus, there is a need to identify and address issues relating to system-level architecture, packet flow control, mobility, and others.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure, nor to delineate the scope of any or all aspects of the disclosure. Its sole purpose is to present some concepts of one or more aspects of the disclosure in a simplified form as a prelude to the more detailed description that is presented later.

Some aspects of the present disclosure provide a method, apparatus, and computer program product for supporting mobility in a Multi-Point HSDPA system capable of downlink aggregation. Some aspects of the disclosure provide modified mobility events utilized for altering the Active Set for a UE. Here, the addition of a cell to the Active Set can coincide with making that cell a secondary serving cell. Further, the deletion of a secondary serving cell from the Active Set can coincide with switching off the Multi-Point HSDPA mode. Still further, a modified mobility event for an HSDPA serving cell change can be utilized to swap a primary serving cell and a secondary serving cell.

In one aspect, the disclosure provides a method of wireless communication for a User Equipment (UE) that is capable of a Multi-Point HSDPA mode utilizing a primary serving cell and a secondary serving cell. Here, the method includes receiving an RRC message including an information element adapted to inform the UE that the secondary serving cell utilizes the same carrier frequency as that of the primary serving cell, and transmitting a response to the RRC message to confirm completion of a reconfiguration in accordance with the RRC message.

Another aspect of the disclosure provides a method of wireless communication including receiving Multi-Point HSDPA data from a primary serving cell and a secondary serving cell, determining that a measurement of the secondary serving cell has fallen below a threshold, transmitting a request corresponding to the measurement, receiving an RRC message that excludes a downlink secondary cell information element, and switching off a Multi-Point HSDPA mode such that an HS-DSCH is not received from the secondary serving cell.

Yet another aspect of the disclosure provides a method of wireless communication for a Radio Network Controller (RNC) that is capable of supporting a Multi-Point HSDPA mode utilizing a primary serving cell and a secondary serving cell. Here, the method includes transmitting an RRC message including an information element adapted to inform a UE that the secondary serving cell utilizes the same carrier frequency as that of the primary serving cell, and receiving a response to the RRC message to confirm completion of a reconfiguration in accordance with the RRC message.

Still another aspect of the disclosure provides a UE capable of a Multi-Point HSDPA mode utilizing a primary serving cell and a secondary serving cell. Here, the UE includes means for receiving an RRC message including an information element adapted to inform the UE that the secondary serving cell utilizes the same carrier frequency as that of the primary serving cell, and means for transmitting a response to the RRC message to confirm completion of a reconfiguration in accordance with the RRC message.

Still another aspect of the disclosure provides an apparatus for wireless communication that includes means for receiving Multi-Point HSDPA data from a primary serving cell and a secondary serving cell, means for determining that a measurement of the secondary serving cell has fallen below a threshold, means for transmitting a request corresponding to the measurement, means for receiving an RRC message that excludes a downlink secondary cell information element, and means for switching off a Multi-Point HSDPA mode such that an HS-DSCH is not received from the secondary serving cell.

Still another aspect of the disclosure provides an RNC capable of supporting a Multi-Point HSDPA mode utilizing a primary serving cell and a secondary serving cell. Here, the RNC includes means for transmitting an RRC message including an information element adapted to inform a UE that the secondary serving cell utilizes the same carrier frequency as that of the primary serving cell, and means for receiving a response to the RRC message to confirm completion of a reconfiguration in accordance with the RRC message.

Still another aspect of the disclosure provides a processing system including at least one processor, and a memory coupled to the at least one processor. Here, the at least one processor is configured for use in a UE that is capable of a Multi-Point HSDPA mode utilizing a primary serving cell and a secondary serving cell. In this example, the at least one processor further configured to receive an RRC message including an information element adapted to inform the UE that the secondary serving cell utilizes the same carrier frequency as that of the primary serving cell, and to transmit a response to the RRC message to confirm completion of a reconfiguration in accordance with the RRC message.

Still another aspect of the disclosure provides a processing system that includes at least one processor, and a memory coupled to the at least one processor. Here, the at least one processor is configured to receive Multi-Point HSDPA data from a primary serving cell and a secondary serving cell, to determine that a measurement of the secondary serving cell has fallen below a threshold, to transmit a request corresponding to the measurement, to receive an RRC message that excludes a downlink secondary cell information element, and to switch off a Multi-Point HSDPA mode such that an HS-DSCH is not received from the secondary serving cell.

Still another aspect of the disclosure provides a processing system that includes at least one processor, and a memory coupled to the at least one processor. Here, the at least one processor is configured for an RNC that is capable of supporting a Multi-Point HSDPA mode utilizing a primary serving cell and a secondary serving cell. In this example, the at least one processor further configured to transmit an RRC message including an information element adapted to inform a UE that the secondary serving cell utilizes the same carrier frequency as that of the primary serving cell, and to receive a response to the RRC message to confirm completion of a reconfiguration in accordance with the RRC message.

Still another aspect of the disclosure provides a computer program product that includes a computer-readable medium configured for a UE capable of a Multi-Point HSDPA mode utilizing a primary serving cell and a secondary serving cell. Here, the computer-readable medium includes code for causing a computer to receive an RRC message including an information element adapted to inform the UE that the secondary serving cell utilizes the same carrier frequency as that of the primary serving cell, and code for causing a computer to transmit a response to the RRC message to confirm completion of a reconfiguration in accordance with the RRC message.

Still another aspect of the disclosure provides a computer program product that includes a computer-readable medium having code for causing a computer to receive Multi-Point HSDPA data from a primary serving cell and a secondary serving cell, code for causing a computer to determine that a measurement of the secondary serving cell has fallen below a threshold, code for causing a computer to transmit a request corresponding to the measurement, code for causing a computer to receive an RRC message that excludes a downlink secondary cell information element, and code for causing a computer to switch off a Multi-Point HSDPA mode such that an HS-DSCH is not received from the secondary serving cell.

Still another aspect of the disclosure provides a computer program product that includes a computer-readable medium configured for an RNC that is capable of supporting a Multi-Point HSDPA mode utilizing a primary serving cell and a secondary serving cell. Here, the computer-readable medium includes code for causing a computer to transmit an RRC message including an information element adapted to inform a UE that the secondary serving cell utilizes the same carrier frequency as that of the primary serving cell, and code for causing a computer to receive a response to the RRC message to confirm completion of a reconfiguration in accordance with the RRC message.

To the accomplishment of the foregoing and related ends, the one or more aspects of the disclosure described herein may include the features hereinafter fully described and particularly pointed out in the claims. The following description and the annexed drawings set forth in detail certain illustrative features of the one or more aspects of the disclosure. These features are indicative, however, of but a few of the various ways in which the principles of various aspects of the disclosure may be employed, and this description is intended to include all such aspects of the disclosure, and their equivalents.

DETAILED DESCRIPTION

Figure 1:
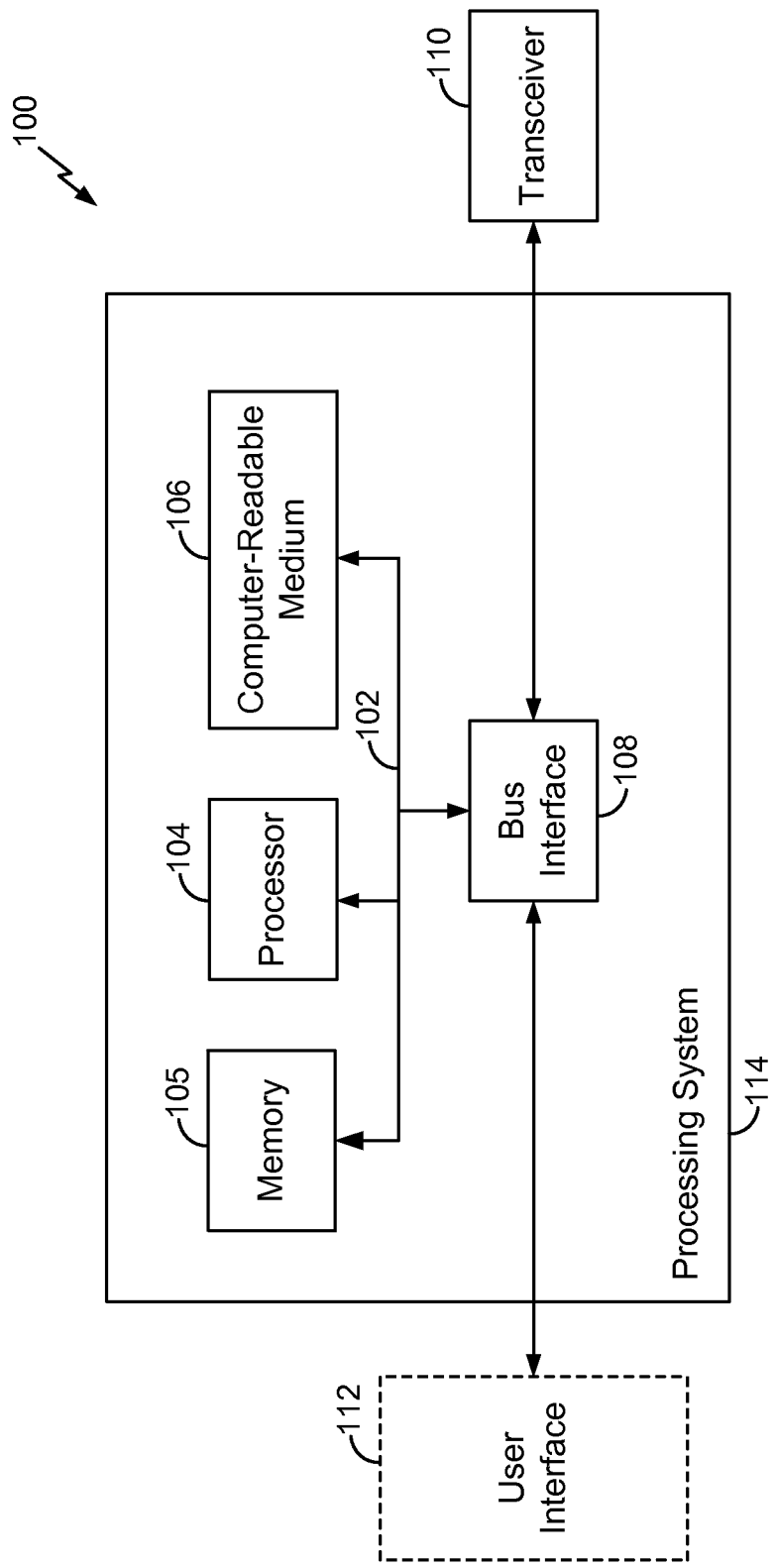
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Here, "medium" may include any media that facilitates transfer of a computer program from one place to another. As an example, the software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
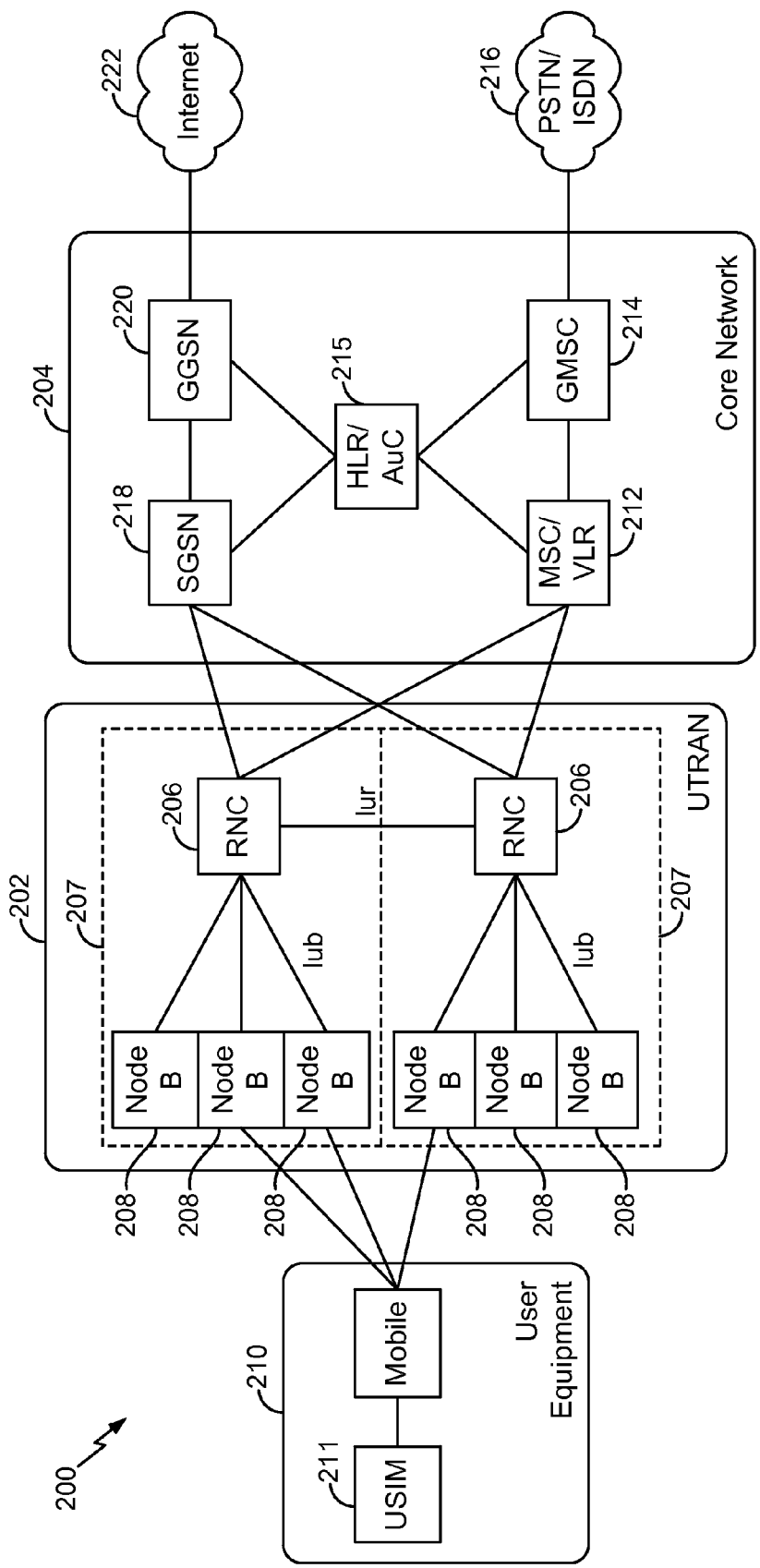
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

A high speed packet access (HSPA) air interface includes a series of enhancements to the 3G/W-CDMA air interface between the Node B 208 and the UE 210, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
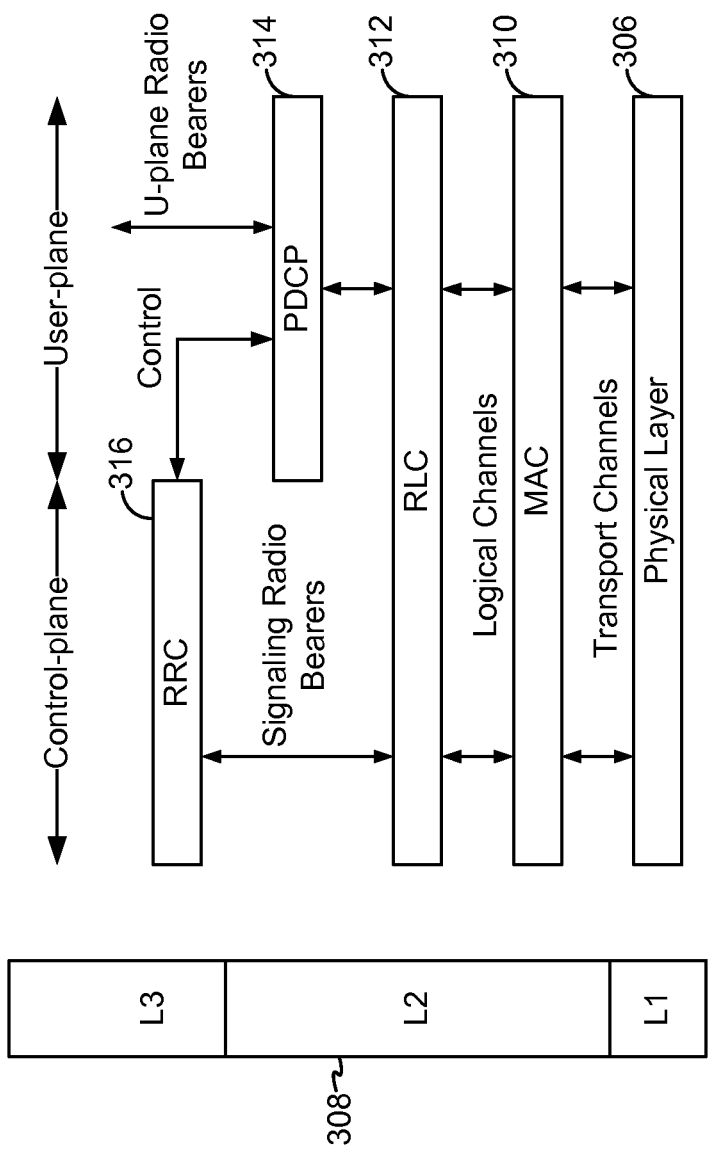
FIG. 3 is a conceptual diagram illustrating an example of a radio protocol architecture for the user and control plane.

The radio protocol architecture between the UE and the UTRAN may take on various forms depending on the particular application. An example for an HSPA system will now be presented with reference to FIG. 3, illustrating an example of the radio protocol architecture for the user and control planes between a UE and a Node B. Here, the user plane or data plane carries user traffic, while the control plane carries control information, i.e., signaling.

Turning to FIG. 3, the radio protocol architecture for the UE and Node B is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 (L2 layer) 308 is above the physical layer 306 and is responsible for the link between the UE and Node B over the physical layer 306.

At Layer 3, the RRC layer 316 handles the control plane signaling between the UE and the RNC. RRC layer 316 includes a number of functional entities for routing higher layer messages, handling broadcast and paging functions, establishing and configuring radio bearers, etc.

In the UTRA air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports acknowledged, unacknowledged, and transparent mode data transfers, and provides segmentation and reassembly of upper layer data packets, retransmission of lost data packets, and reordering of data packets to compensate for out-of-order reception due to a hybrid automatic repeat request (HARM). That is, the RLC sublayer 312 includes a retransmission mechanism that may request retransmissions of failed packets. Here, if the RLC sublayer 312 is unable to deliver the data correctly after a certain maximum number of retransmissions or an expiration of a transmission time, upper layers are notified of this condition and the RLC SDU may be discarded.

Further, the RLC sublayer at the RNC 206 (see FIG. 2) may include a flow control function for managing the flow of RLC protocol data units (PDUs). For example, the RNC may determine an amount of data to send to a Node B, and may manage details of that allocation including dividing the data into batches and distributing those batches or packets among multiple Node Bs in the case of downlink aggregation, e.g., in a DC-HSDPA system or a Multi-Point HSDPA system.

The MAC sublayer 310 provides multiplexing between logical and transport channels. The MAC sublayer 310 is also responsible for allocating the various radio resources (e.g., resource blocks) in one cell among the UEs, as well as HARQ operations. The MAC sublayer 310 can include various MAC entities, including but not limited to a MAC-d entity and MAC-hs/ehs entity.

Figure 4:
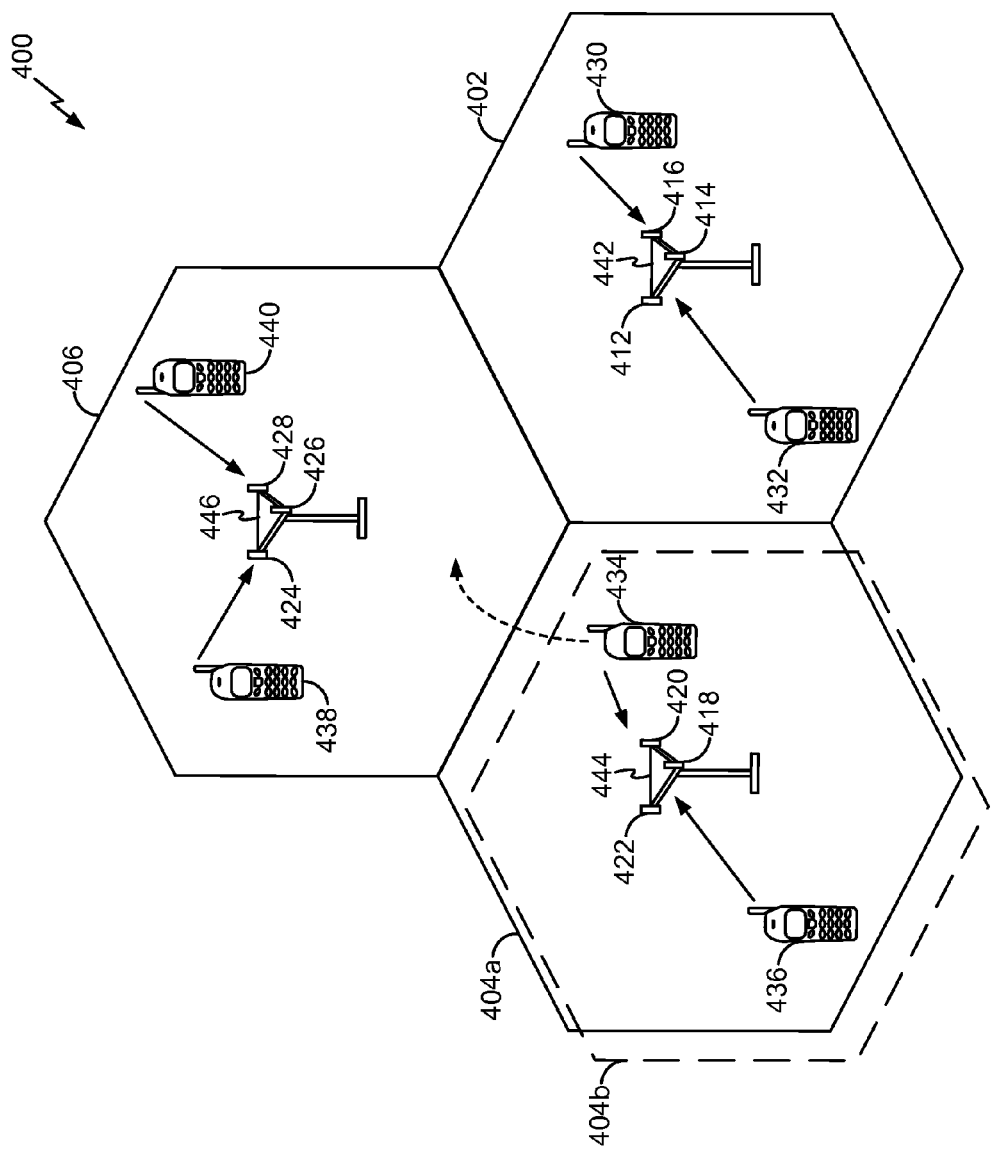
FIG. 4 is a conceptual diagram illustrating an example of an access network.

FIG. 4 illustrates by way of example and without limitation a simplified access network 400 in a UMTS Terrestrial Radio Access Network (UTRAN) architecture, which may utilize HSPA. The system includes multiple cellular regions (cells), including cells 402, 404, and 406, each of which may include one or more sectors. In the present disclosure, the term "cells" may refer generally to communication channels between UEs and Node Bs, and may include sectors depending on the context. Cells may be defined geographically, e.g., by coverage area, and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within the cell can be formed by groups of antennas, with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector.

The cells 402, 404 and 406 may include several UEs that may be in communication with one or more sectors of each cell 402, 404 or 406. For example, UEs 430 and 432 may be in communication with Node B 442, UEs 434 and 436 may be in communication with Node B 444, and UEs 438 and 440 may be in communication with Node B 446. Here, each Node B 442, 444, 446 is configured to provide an access point to a core network 204 (see FIG. 2) for all the UEs 430, 432, 434, 436, 438, 440 in the respective cells 402, 404, and 406.

During a call with the source cell 404a, or at any other time, the UE 436 may monitor various parameters of the source cell 404a as well as various parameters of neighboring cells such as cells 404b, 406, and 402. Further, depending on the quality of these parameters, the UE 436 may maintain some level of communication with one or more of the neighboring cells. During this time, the UE 436 may maintain an Active Set, that is, a list of cells that the UE 436 is simultaneously connected to (i.e., the UTRA cells that are currently assigning a downlink dedicated physical channel DPCH or fractional downlink dedicated physical channel F-DPCH to the UE 436 may constitute the Active Set). Here, the cells in the Active Set can form a soft handover connection to the UE. The UE may additionally include a neighbor set or monitored set, including a list of cells that the UE may measure, but whose signal strength is not high enough to be included in the Active Set.

Management of the Active Set can be enabled through the use of certain Radio Resource Control (RRC) messages between the RNC and UE. For example, the selection of cells to include in the Active Set may depend on certain UE measurements, which may be configured by the network in a system information block (SIB).

For example, the UE may measure a ratio between the signal strength and the noise floor ($E_c/I_0$) of a pilot signal (e.g., a common pilot channel CPICH) transmitted by each cell in the UE's monitored set. That is, the UE may determine the $E_c/I_0$ for nearby cells, and may rank the cells based on these measurements.

When the ranking of a cell changes, or if any other reporting trigger or measurement event (discussed in further detail below) occurs, the UE may send certain RRC messages to the RNC to report this event. Thus, the RNC may make a decision to alter the Active Set for the UE, and send an RRC message (i.e., an Active Set Update message) to the UE indicating a change in the Active Set. The RNC may then communicate with the respective Node B or Node Bs, e.g., over an Iub interface utilizing Node B Application Part (NBAP) signaling to configure the cells for communication with the UE. Finally, the RNC may communicate with the UE utilizing further RRC messages, such as a Physical Channel Reconfiguration (PCR) message, with an RRC response from the UE of PCR Complete indicating success of the reconfiguration.

Figure 5A:
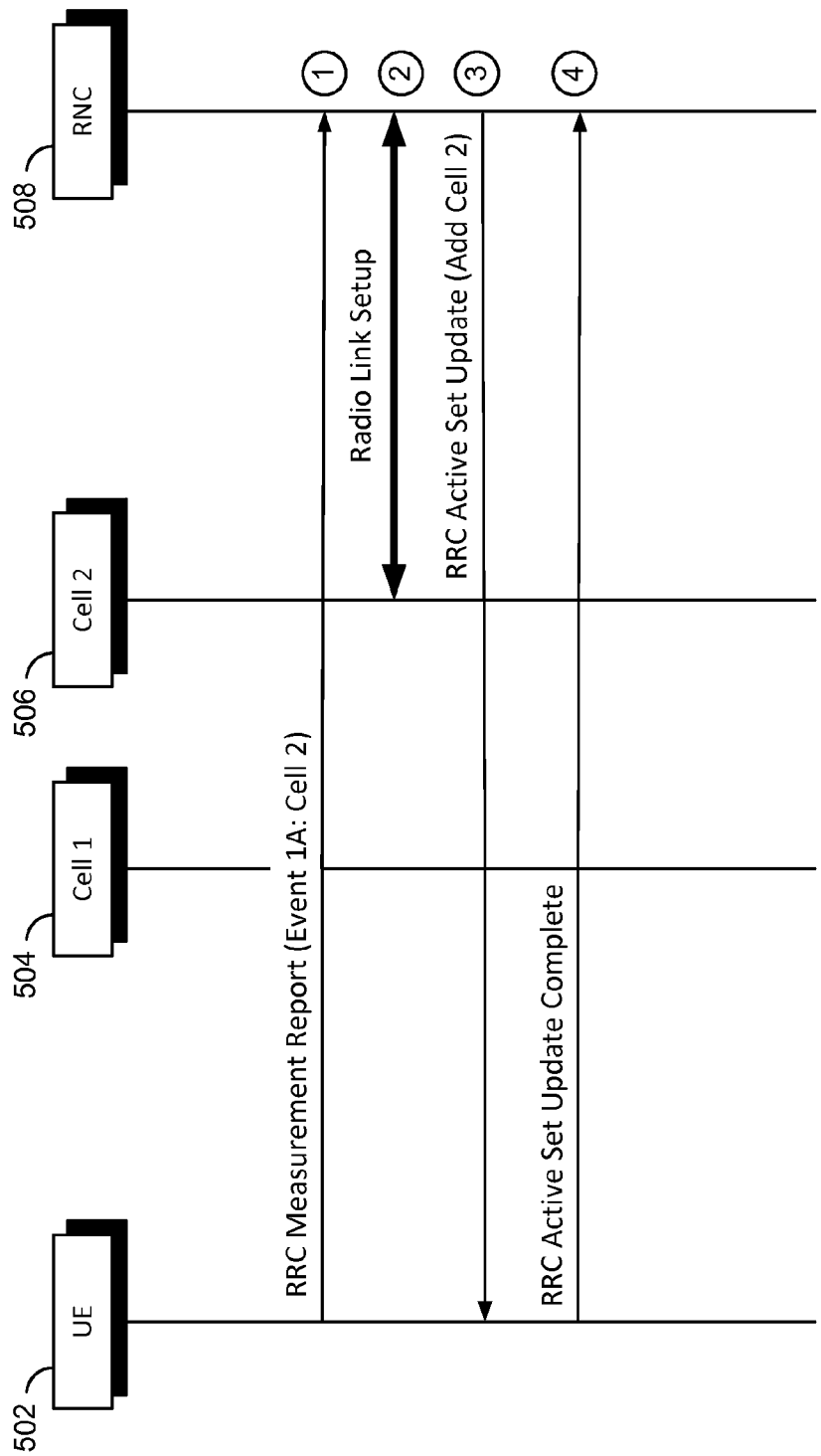
FIG. 5A is a call flow diagram illustrating an Event 1A procedure.

One reporting trigger may result when a primary CPICH enters the reporting range for the UE. That is, when the $E_c/I_0$ for a particular cell reaches a particular threshold (e.g., a certain number of dB below the $E_c/I_0$ of the primary serving cell) and maintains that level for a certain time such that it may be appropriate to add the cell to the Active Set a reporting event called Event 1A may occur. FIG. 5A is a simplified call flow diagram illustrating some of the signaling among nodes for Event 1A. In this and the call flow diagrams to follow, time generally proceeds from the top of the diagram to the bottom, although in many cases the illustrated sequence of signals is not intended to be the only possible sequence, and other sequences may be utilized in accordance with various aspects of the present disclosure. Further, the sequence numbers at the right-hand side of the call flow diagrams is merely placed to ease a description, and each time number may represent any reasonable span of time from an instant to several seconds.

In the illustrated example, at time (1) the UE 502 has determined that a measurement of Cell 2 has increased above a threshold and entered a reporting range, and thus, the UE 502 may transmit an RRC Measurement Report message including Event 1A and identifying Cell 2, 506. In response, at time (2) the RNC 508 may communicate with Cell 2, 506, over the Iub interface utilizing NBAP signaling to set up a radio link with the UE 502. At time (3), the RNC 508 may send an RRC Active Set Update message to the UE 502 indicating to add Cell 2, 506, to its Active Set. The UE 502 may respond at time (4) with an RRC Active Set Update Complete message to the RNC 508, completing the Active Set update.

Figure 5B:
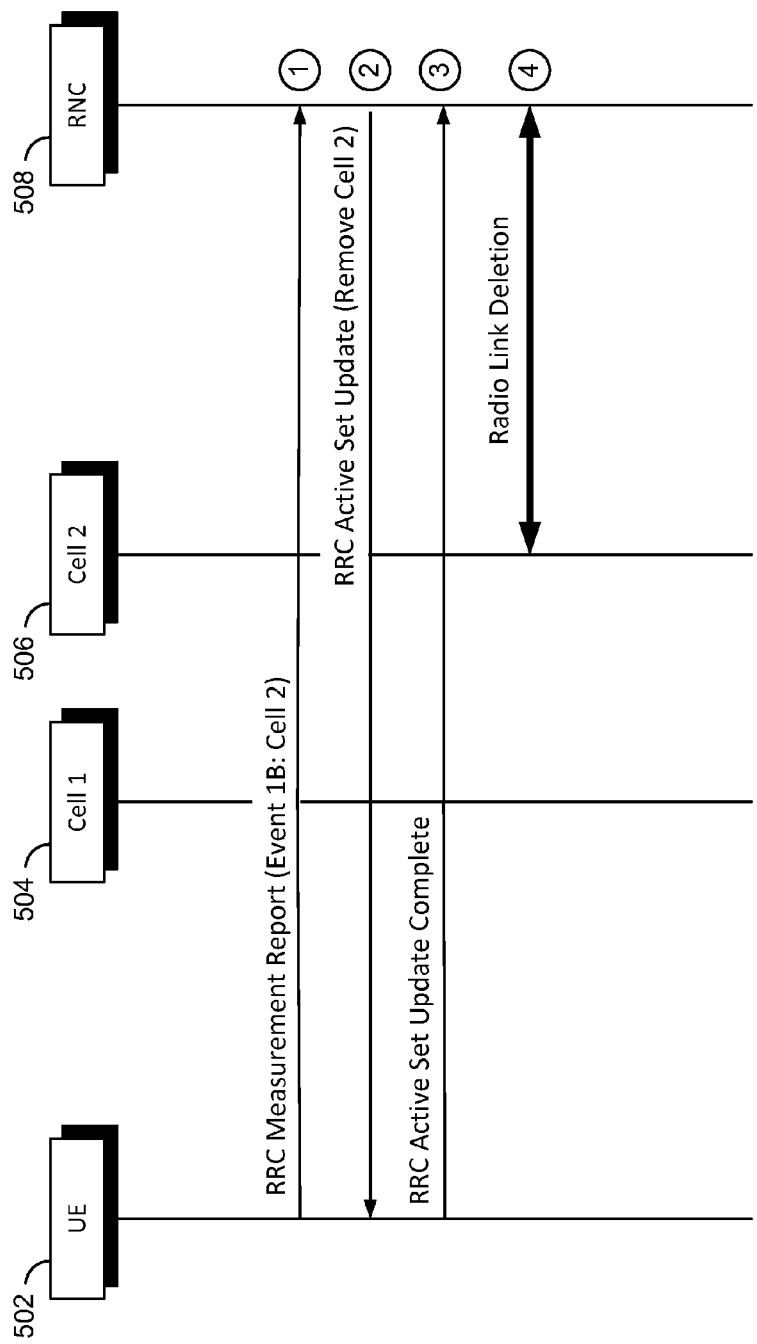
FIG. 5B is a call flow diagram illustrating an Event 1B procedure.

Another reporting trigger may result when a primary CPICH leaves the reporting range. That is, when the $E_c/I_0$ for a particular cell falls below a particular threshold (e.g., a certain number of dB below the $E_c/I_0$ of the primary serving cell), and maintains that level for a certain time such that it may be appropriate to remove the cell from the Active Set a reporting event called Event 1B may occur. FIG. 5B is a simplified call flow diagram illustrating some of the signaling among nodes for Event 1B. In the illustrated example, at time (1) the UE 502 has determined that Cell 2, 506 has left the reporting range. Thus, the UE 502 may transmit the RRC Measurement Report message including Event 1B and identifying Cell 2 506. In response, at time (2) the RNC 508 may transmit an RRC Active Set Update message to the UE 502 indicating to remove Cell 2 506 from the Active Set. At time (3), the UE 502 may then respond with an RRC Active Set Update Complete message to the RNC 508, indicating that the Active Set is updated. At time (4) the RNC 508 may then transmit NBAP signaling over the Iub interface to Cell 2 506 to delete the radio link between Cell 2 506 and the UE 502.

Another reporting trigger may result when the Active Set is full, and a primary CPICH of a candidate cell outside the Active Set exceeds that of the weakest cell in the Active Set, such that it may be appropriate to replace the weakest cell in the Active Set with the candidate cell. Here, a reporting event called Event 1C may occur, causing a combined radio link addition and removal. Because the Event 1C is substantially a combination of the Event 1A and Event 1B, and is known to those skilled in the art, a detailed description is not included herein.

In Release 5 of the 3GPP family of standards, High Speed Downlink Packet Access (HSDPA) was introduced.). HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-DSCH may be associated with one or more HS-SCCH. The HS-SCCH is a physical channel that may be utilized to carry downlink control information related to the transmission of HS-DSCH. The UE may continuously monitor the HS-SCCH to determine when to read its data from the HS-DSCH, and the modulation scheme used on the assigned physical channel.

The HS-PDSCH is a physical channel that may be shared by several UEs. The HS-PDSCH may support quadrature phase shift keying (QPSK) and 16-quadrature amplitude modulation (16-QAM) and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Rel. 5 HSDPA, at any instance a UE has one serving cell, that being the strongest cell in the Active Set as according to the UE measurements of $E_c/I_0$. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Figure 5C:
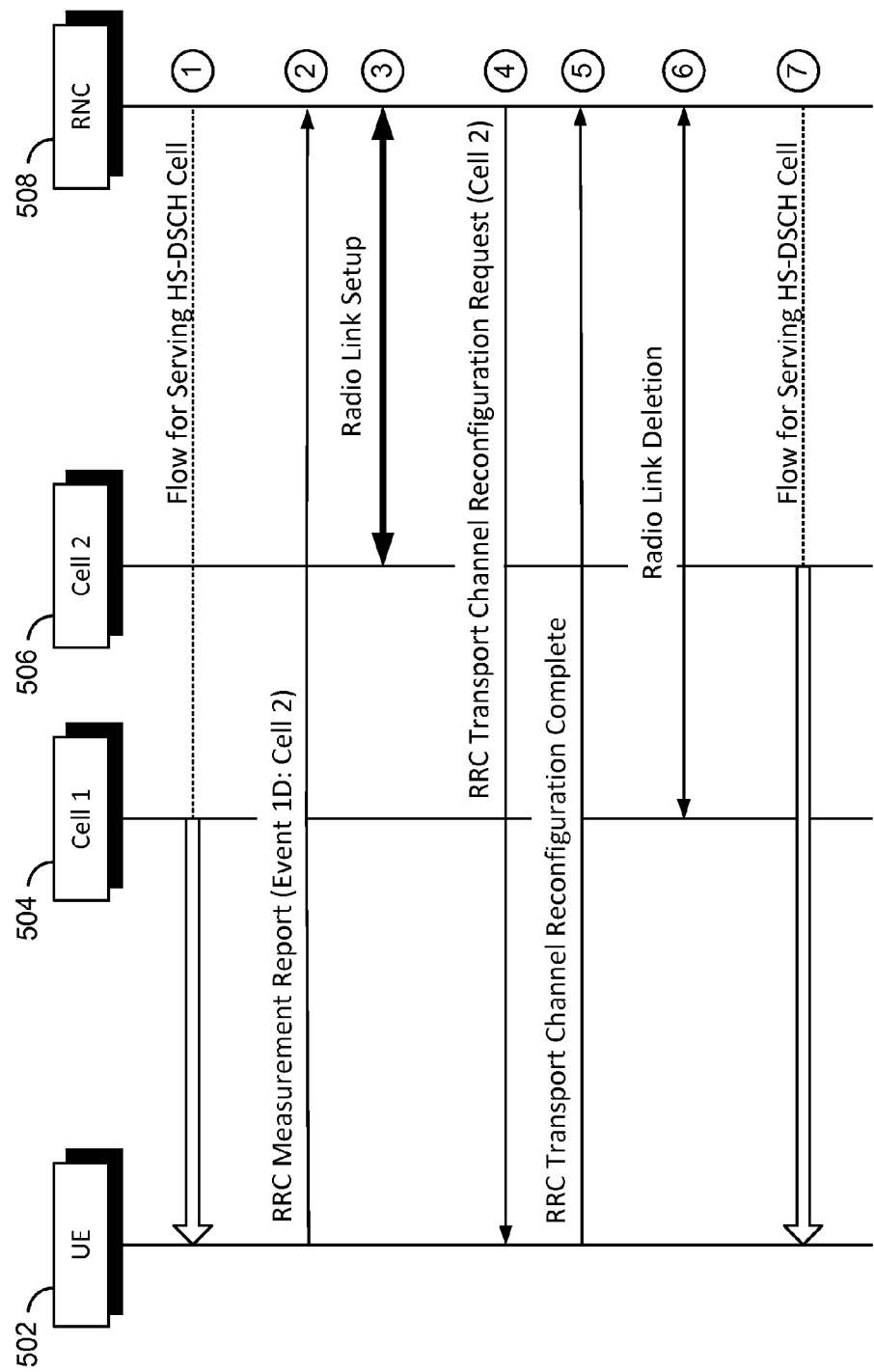
FIG. 5C is a call flow diagram illustrating an Event 1D procedure.

That is, in addition to the reporting triggers dealing with Event 1A and Event 1B, described above, for HSDPA, another reporting trigger may result when a neighbor cell (which may or may not be within the Active Set) exceeds the quality of the serving HS-DSCH cell according to the UE measurements of $E_c/I_0$. In this case it may be appropriate to re-select the serving HS-DSCH cell. FIG. 5C is a simplified call flow diagram illustrating some of the signaling among nodes for Event 1D, which is the measurement event for the best serving HS-DSCH cell. In the illustrated example, at time (1) Cell 1 504 begins as the serving HS-DSCH cell. At time (2), the UE 502 may determine that Cell 2, 506, exceeds Cell 1, 504 in terms of its CPICH $E_c/I_0$. Thus, the UE 502 may transmit an RRC Measurement Report message including Event 1D and identifying Cell 2 506. In response, at time (3) the RNC 508 may transmit signaling to Cell 2 506 over the Iub interface utilizing NBAP signaling to set up a radio link with the UE 502. At time (4), the RNC 508 may send an RRC Transport Channel Reconfiguration Request to the UE 502 indicating a serving cell change, such that Cell 2, 506, will be the new serving HS-DSCH cell. The UE 502 may then respond at time (5) with an RRC Transport Channel Reconfiguration Complete message to the RNC 508. At time (6), the RNC may utilize NBAP signaling to delete the radio link setup at Cell 1 504. Thus, at time (7) HSDPA service can begin with the new serving HS-DSCH cell, i.e., Cell 2, 506.

Although some differences may exist for inter-frequency handovers, as known to those having ordinary skill in the art, those are largely outside the scope of the present disclosure and are not discussed herein.

Release 8 of the 3GPP standards brought dual cell HSDPA (DC-HSDPA), which enables a UE to aggregate dual adjacent 5-MHz downlink carriers. The dual carrier approach provides higher downlink data rates and better efficiency at multicarrier sites. Generally, DC-HSDPA utilizes a primary (anchor) carrier and a secondary carrier, where the primary carrier provides the channels for downlink data transmission and the channels for uplink data transmission, and the secondary carrier provides a second set of HS-PDSCHs and HS-SCCHs for downlink communication.

In DC-HSDPA, the downlink carriers are generally provided by the same cell, and mobility is based on the primary carrier. Thus, the mobility procedures are largely the same as those utilized for single-carrier HSDPA. However, additional information may be included in the RRC handover messaging to indicate whether to use single or dual carriers after a handover to a target cell, since not all cells may support DC-HSDPA. Here, the information element (IE) in the RRC message for a handover to a DC-HSDPA-capable Node B can include information about the frequency or carrier for the secondary carrier at the target cell.

According to some aspects of the present disclosure, another form of carrier aggregation that may be referred to as soft aggregation provides for downlink carrier aggregation, wherein the respective downlink carriers utilize the same frequency carrier. Soft aggregation strives to realize similar gains to DC-HSDPA in a single-carrier network.

Figure 6:
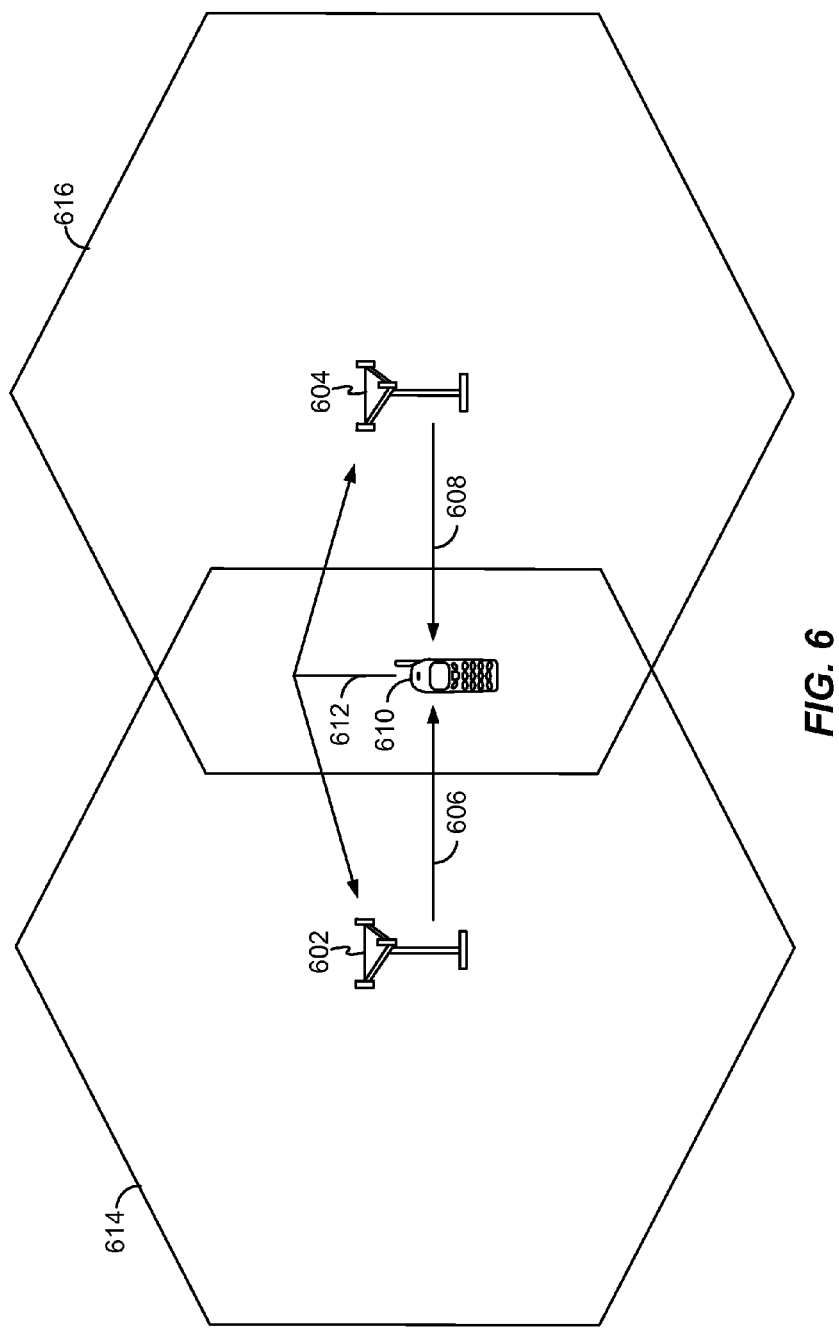
FIG. 6 is a schematic diagram illustrating a portion of a multi-point HSDPA network.

FIG. 6 illustrates an exemplary system for soft aggregation in accordance with some aspects of the present disclosure. In FIG. 6, there may be a geographic overlap between two or more cells 614 and 616, such that a UE 610 may be served, at least for a certain period of time, by the multiple cells. Thus, a wireless telecommunication system in accordance with the present disclosure may provide HSDPA service from a plurality of cells on a single frequency channel, such that a UE may perform carrier aggregation. For example, a setup utilizing two cells may be referred to as Single Frequency Dual Cell HSDPA (SFDC-HSDPA), Coordinated Multi-Point HSDPA (CoMP HSDPA), or simply Multi-Point HSDPA. However, other terminology may freely be utilized. In this way, users at cell boundaries, as well as the overall system, may benefit from a high throughput. Here, the different cells may be provided by the same Node B, or the different cells may be provided by disparate Node Bs.

In the scheme illustrated in FIG. 6, two disparate Node Bs 602 and 604 each provide an HSDPA downlink carrier 606 and 608, respectively, wherein the downlink carriers are in substantially the same carrier frequency. Of course, as already described, in another aspect, both downlink carriers 606 and 608 may be provided from different sectors of the same Node B. Here, the UE 610 receives and aggregates the downlink carriers and provides an uplink channel 612, which is received by both Node Bs 602 and 604. The uplink channel 612 from the UE 610 may provide feedback information, e.g., corresponding to the downlink channel state for the corresponding downlink carriers 606 and 608.

Mobility for the Multi-Point HSDPA system as illustrated in FIG. 6 can be somewhat more involved than mobility for an HSDPA or a DC-HSDPA system, since those systems generally provide the respective HS downlink channels from a single Node B site, whereas for Multi-Point HSDPA there may be an active link with a plurality of Node B sites. For example, mobility for the Multi-Point HSDPA system may include instructions and procedures to enable a system to begin the aggregation of two serving cells, to end the serving from a secondary serving cell and go into single-cell HSDPA, and to change the identity of either one of the primary or secondary serving cells.

Some aspects of the present disclosure utilize an identifier such as a pre-designated International Mobile Subscriber Identity (IMSI) or Packet Temporary Mobile Subscriber Identity (P-TMSI) that may be used by the RNC to determine that the UE supports Multi-Point HSDPA. Additionally, a UE that is capable of Multi-Point HSDPA in accordance with some of the aspects of the present disclosure may re-use the Release-8 DC-HSDPA capability in the information element (IE) called "Multi cell support" in an RRC message such as one or more of an RRC Connection Request message, an RRC Measurement Report message, an RRC Physical Channel Reconfiguration message, an RRC Physical Channel Reconfiguration Complete message, an RRC Active Set Update messages, or an RRC Active Set Update Complete message.

Further, mobility procedures for changing at least one of the primary serving cell or the secondary serving cell in accordance with various aspects of the present disclosure may at least partially utilize pre-existing mobility events. That is, some existing mobility events can map to new events applicable to mobility for a Multi-Point HSDPA system. Further aspects of the present disclosure provide for new mobility events to handle certain issues that may be unique to the Multi-Point HSDPA system.

Some aspects of the present disclosure provide for stand-alone switching on and switching off of a Multi-Point HSDPA mode, without affecting the Active Set. That is, a UE utilizing HSDPA and having at least two cells in its Active Set may utilize a mobility procedure in accordance with this aspect of the present disclosure to switch on a Multi-Point HSDPA mode and begin aggregation of one of the non-serving cells in the Active Set, without changing the set of cells listed in the Active Set. Further, a UE utilizing Multi-Point HSDPA with a primary serving HS-DSCH cell and a secondary serving HS-DSCH cell may utilize a mobility procedure in accordance with an aspect of the present disclosure to switch off the Multi-Point HSDPA mode and cease the downlink aggregation.

Additional aspects of the present disclosure may provide for piggy-backing of the switching on and switching off of a Multi-Point HSDPA mode, along with the mobility procedures for adding new cells to the Active Set and deleting cells from the Active Set.

For example, the mobility event called Event 1A, as described above, can be utilized to add a new cell to the Active Set. In accordance with some aspects of the present disclosure, one or more of the RRC messages utilized for this mobility event can include a new or modified information element (IE) to enable the switching on of a Multi-Point HSDPA mode. That is, the starting of the HS service from a secondary cell can coincide with the adding of the new cell to the Active Set.

Figure 7A:
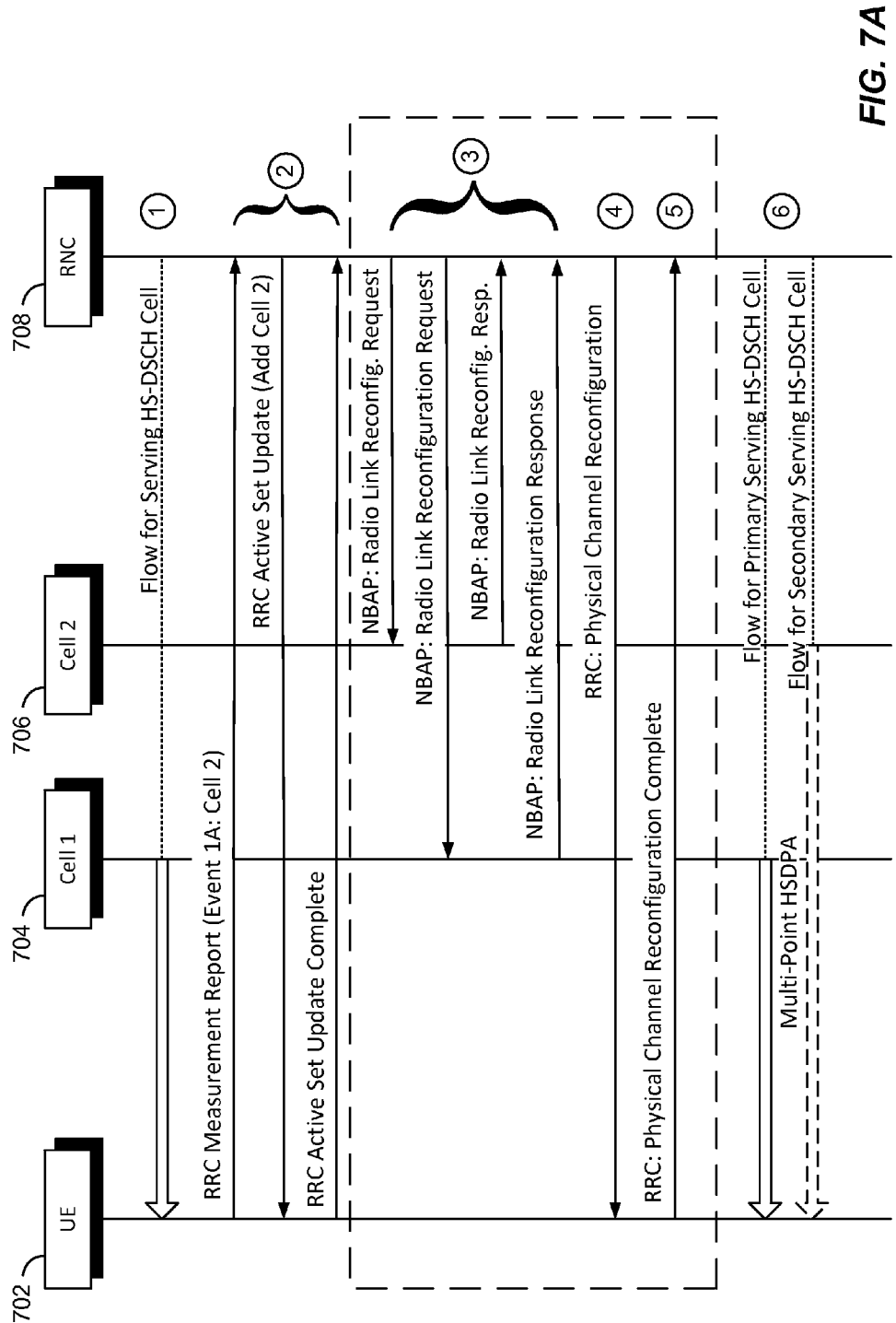
FIG. 7A is a call flow diagram illustrating a switching on of a Multi-Point HSDPA mode during an Event 1A procedure.

FIG. 7A is a simplified call flow diagram illustrating some of the signaling utilized in accordance with one aspect of the present disclosure wherein the switching on of Multi-Point HSDPA service is included within the same sequence as the addition of a new cell into the Active Set upon the measurement event called Event 1A.

Here, as described in further detail below, Physical Channel Reconfiguration (PCR) messaging can be utilized to activate the secondary serving HS-DSCH cell as that cell is added to the Active Set.

In the illustrated example, the UE 702 is enabled for Multi-Point HSDPA, but begins the illustration at time (1) configured for single-cell HSDPA communication with Cell 1, 704. Here, for the sake of simplicity, at this time the UE 702 has an Active Set that includes only Cell 1, 704.

The initial signaling at time (2) for the Event 1A operations is substantially the same as that illustrated in FIG. 5A, including an RRC Measurement Report, RRC Active Set Update, and RRC Active Set Update Complete message. However, in some examples, one or more of the RRC messages between the UE 702 and the RNC 708, such as the RRC Measurement Report message from the UE 702 to the RNC 708 may include an information element (IE) adapted to indicate that the UE 702 is capable of Multi-Point HSDPA service, although in other examples some of the RRC messages need not include such an IE. For example, the IE may indicate Multi cell support, similar to an IE utilized in a Release-8 DC-HSDPA system. However, in other aspects, an earlier RRC communication called the Connection Request message may include the Multi cell support IE, such that its inclusion in the Active Set Update signaling may not be needed.

At time (3), the RNC 708 may communicate over NBAP with Cell 2, 706, utilizing Radio Link Reconfiguration messages to set up Cell 2, 706, as a secondary serving HS-DSCH cell for the UE 702 in a Multi-Point HSDPA system, including initializing flow control and a MAC-ehs scheduler and preparing to provide HS service at an activation time. Similarly, over NBAP, Cell 1, 704, may communicate with the RNC 708 utilizing Radio Link Reconfiguration messages to set up Cell 1, 704, as the primary serving HS-DSCH cell in a Multi-Point HSDPA system, including an HS-DPCCH format change at the activation time.

At time (4), the RNC 708 may send a Physical Channel Reconfiguration (PCR) message to the UE 702. Here, in an aspect of the present disclosure, the PCR message may include an information element (IE) for informing the UE 702 about one or more characteristics of the secondary serving HS-DSCH cell, e.g., that the secondary serving cell will utilize the same carrier as the primary serving HS-DSCH cell. In some examples, a new IE different from those utilized in a Release-8 DC-HSDPA system may be utilized, specific for the Multi-Point HSDPA system. In other examples, the PCR message may re-use certain Release-8 IEs such as the IE "Downlink Secondary Cell Info FDD," described in Release-8 of the RRC Protocol Specification, 3GPP TS 25.331, section 8.6.6.45, and an "Activation Time," described in the same document at section 8.6.3.1. For example, in a Release-8 DC-HSDPA system, a PCR message may include this IE, adapted to indicate which carrier is to be added, a cell identifier, and any other information that may be necessary to start the HS service from that cell. For example, the IE may include information about the frequency or carrier identification.

In an aspect of the present disclosure, the UE 702 may re-interpret the "Downlink Secondary Cell Info FDD" IE in such a way as to enable the switching on of the Multi-Point HSDPA mode. Here, in accordance with an aspect of the present disclosure, the "Downlink Secondary Cell Info FDD" IE may indicate the same carrier as the existing serving HS-DSCH cell. In this way, the UE 702 may re-interpret the IE as an indicator that the system is being configured for Multi-Point HSDPA, utilizing the same frequency carrier aggregation.

When the PCR message is transmitted to the UE, the RNC 708 may begin a Multi-Link RLC algorithm for coordinating transmissions to the UE 702 over dual MAC-ehs entities at Cell 1 704 and Cell 2 706. Further, an activation time may occur when the UE 702 receives the PCR message from the RNC 708. At the activation time, the UE 702 may prepare for reception of the HS-PDSCH and HS-SCCH from the MAC-ehs entity corresponding to Cell 2, 706, and the new HS-DPCCH transmission format. At this time the HS transmission from the secondary serving HS-DSCH cell, i.e., Cell 2, 706, may begin. At time (5), the PCR Complete message may be sent to the RNC 708 confirming the completion of the secondary serving HS-DSCH cell reception. Thus, at time (6) data may flow from the RNC to the respective cells 704 and 706, and the UE may communicate with both cells 704 and 706 utilizing Multi-Point HSDPA service.

In another aspect of the disclosure, the switching on of the Multi-Point HSDPA mode may be piggy-backed onto the Active Set Update procedure, without necessarily requiring the PCR messaging between the RNC 708 and the UE 702. That is, in some examples, the Active Set Update procedure illustrated in FIG. 7A at time (2) can activate the secondary serving cell by including the suitable IE in the Active Set Update message, including the necessary information for setting up the secondary serving HS-DSCH cell.

In another aspect of the disclosure, a standalone PCR procedure may be utilized to switch on the Multi-Point HSDPA mode when there are at least two cells are in the Active Set for the UE. Thus, the downlink for the secondary serving HS-DSCH cell can be activated for an existing cell in the Active Set, such that the Active Set does not change. This way, the Multi-Point HSDPA mode may be activated by the RNC without the UE being required to send information relating to channel measurements.

Here, as above, a PCR message can be utilized to activate the secondary serving HS-DSCH cell as a cell already in the Active Set. Here, a reporting trigger may not be necessary, and alterations to the Active Set for the UE may not be needed. In one example, the procedure illustrated in FIG. 7A, without the Active Set Update signaling illustrated at time (2), may be utilized. That is, in an aspect of the present disclosure, without altering the Active Set, the RNC 708 may make a decision to add a cell in the UE's Active Set to become a secondary serving HS-DSCH cell utilizing a Multi-Point HSDPA mode. As such, the RNC 708 may utilize NBAP to provide Radio Link Reconfiguration messages to Cell 1 704 and Cell 2 706 as illustrated at time (3), and provide the PCR message to the UE 702, including an IE indicating to the UE to include the cell (e.g., Cell 2, 706) in its Active Set as a secondary serving HS-DSCH cell in a Multi-Point HSDPA mode.

In another aspect of the present disclosure, the mobility event called Event 1B, as described above, may be utilized to delete a cell from the Active Set. Here, one or more of the RRC messages utilized for this mobility event can include a new or modified IE to enable the switching off of the Multi-Point HSDPA mode. That is, the stopping of the HS service from a secondary cell can coincide with the deleting of the secondary cell from the Active Set.

Figure 7B:
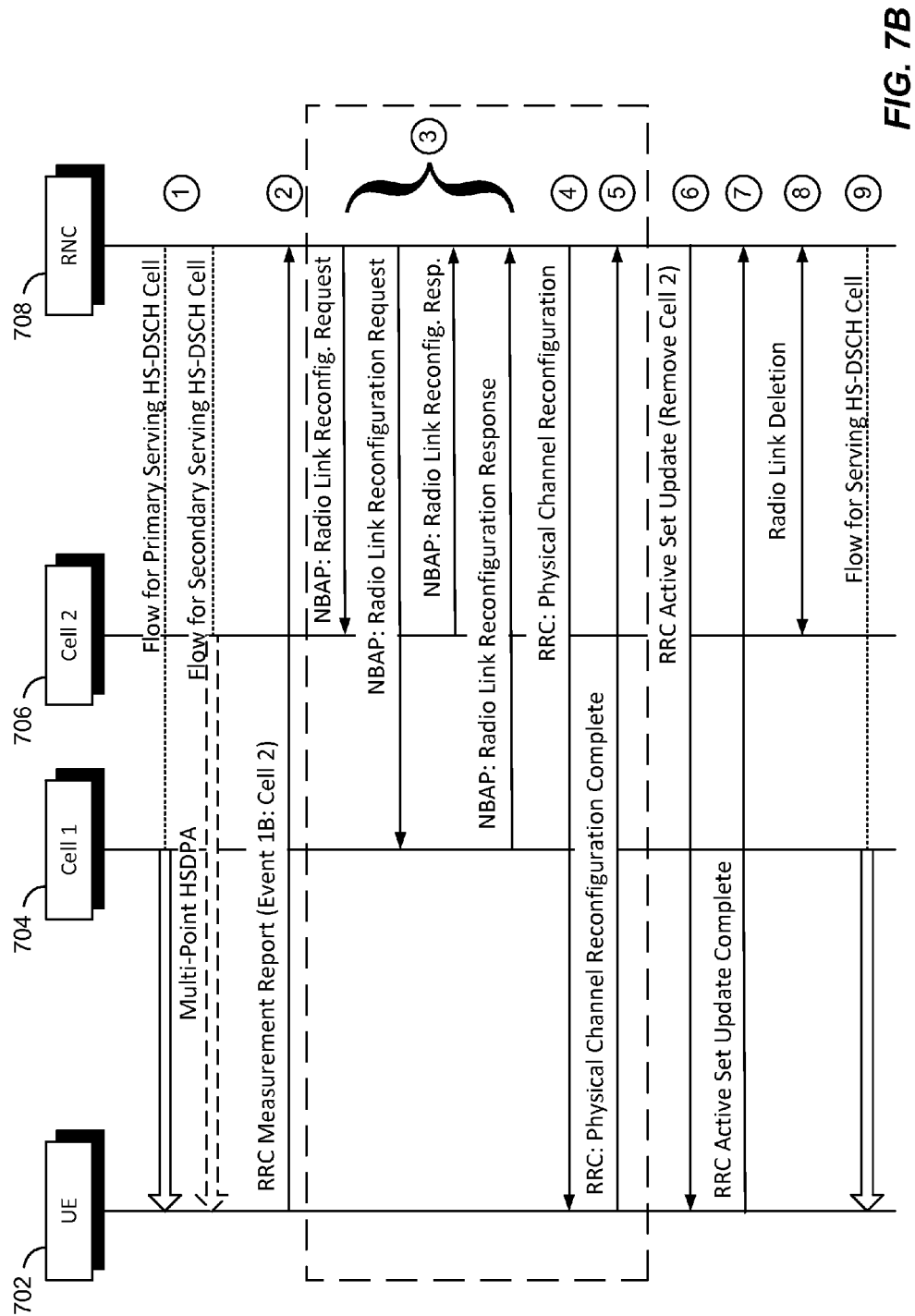
FIG. 7B is a call flow diagram illustrating a switching off of a Multi-Point HSDPA mode during an Event 1B procedure.

FIG. 7B is a simplified call flow diagram illustrating some of the signaling utilized in accordance with one aspect of the present disclosure wherein the switching off of the Multi-Point HSDPA service is included within the same sequence as the deletion of the secondary cell from the Active Set upon the measurement event called Event 1B.

In the illustrated example, at time (1) the UE 702 is enabled for Multi-Point HSDPA service, and the Multi-Point HSDPA service is provided by Cell 1, 704 and Cell 2, 706. Here, for the sake of simplicity, at this time cells 1 and 2 704, 706 are the only cells in the Active Set for the UE 702. Of course, various examples in accordance with aspects of the present disclosure need not require the Active Set to be limited to the cells providing Multi-Point HSDPA service.

At time (2) the UE 702 may determine that the primary CPICH corresponding to Cell 2, 706, has fallen below a threshold and thus left a reporting range, and accordingly transmit an RRC Measurement Report message reporting Event 1B and identifying Cell 2, 706. With this message, in accordance with an aspect of the present disclosure the UE may request deletion of the secondary serving cell from its Active Set. That is, in some aspects of the disclosure, the RRC Measurement Report message reporting Event 1B may include an IE indicating that the UE 702 is engaged in Multi-Point HSDPA service and wishes to delete an active link from the Active Set; however, in another aspect of the present disclosure the RRC Measurement Report reporting Event 1B may take a conventional message format as described above with respect to FIG. 5B.

At time (3) the RNC 708 may communicate with Cell 1, 704, and Cell 2, 706, over NBAP utilizing Radio Link Reconfiguration messages to inform Cell 2, 706, to terminate the HS channels, and to inform Cell 1, 704, of the termination of the secondary serving HS-DSCH cell corresponding to Cell 2, 706 and prepare it for an HS-DPCCH format change corresponding to a switching off of the Multi-Point HSDPA mode. Here, Cell 2, 706, may flush its queue of data addressed to the UE 702.

At time (4) the RNC 708 may send a PCR message to the UE 702, which may exclude an IE corresponding to the nature of the secondary serving HS-DSCH cell, i.e., being in the same frequency channel as that utilized by Cell 1, 704. For example, the UE may be informed of the termination of the secondary serving cell by receiving a PCR message that does not include the Release-8 IE "Downlink Secondary Cell Info FDD." That is, the exclusion of such an IE in this message may be interpreted by the UE 702 as an indication that the Multi-Point HSDPA service is being switched off, and that the UE 702 is to engage in single-cell HSDPA service. The activation time may follow the PCR message from the RNC 708 to the UE 702, at which time the HS service from the secondary serving HS-DSCH cell, i.e., Cell 2, 706, may be terminated, and the HS-DPCCH format corresponding to the primary serving HS-DSCH cell, i.e., Cell 1, may change. Further, the UE 702 may terminate its HS-PDSCH and HS-SCCH reception and remove the MAC-ehs entity corresponding the secondary serving HS-DSCH cell and start utilizing a single-cell HSDPA transmission format. Additionally, a flow control algorithm at the RNC 706 may cease sending data to Cell 2, 706, and cease the algorithm for a Multi-Link RLC.

At time (5) the UE 702 may send a PCR Complete message to the RNC 708 to confirm the removal of the secondary serving HS-DSCH cell. The RNC 708 may send at time (6) an RRC Active Set Update message to the UE 702 indicating for the UE 702 to delete Cell 2, 706, from its Active Set, to which the UE 702 may respond at time (7) with an RRC Active Set Update Complete message to the RNC 708. At time (8) the RNC 708 may utilize NBAP to delete the radio link at Cell 2, 706. As such, at time (9) the UE 702 may receive an HSDPA data flow from the RNC 708 by way of Cell 1, 704, utilizing single-cell HSDPA service.

In another aspect of the present disclosure, the switching off of the Multi-Point HSDPA mode may be piggy-backed onto the RRC Measurement Report and Active Set Update procedure, without requiring the PCR messaging between the RNC 708 and the UE 702. That is, in some examples, the Event 1B procedure can de-activate the secondary serving cell by excluding the IE relating to the Multi-Point HSDPA mode in one or more of the RRC signaling messages for Event 1B, such that the Multi-Point HSDPA service can be de-activated without requiring the PCR messaging.

In another aspect of the disclosure, a standalone procedure may be utilized to switch off the Multi-Point HSDPA mode when a characteristic of the secondary serving HS-DSCH cell is such that switching off the secondary downlink and returning to single-cell HSDPA is appropriate. Thus, the downlink for the secondary serving HS-DSCH cell can be deactivated such that the Active Set does not change. That is, in an aspect of the disclosure, the former secondary serving HS-DSCH cell can remain a member of the Active Set.

Here, as above, a PCR message can be utilized to deactivate the secondary serving HS-DSCH cell. Here, a reporting trigger may not be necessary, and alterations to the Active Set for the UE may not be needed. In one example, the procedure illustrated in FIG. 7B, without the Active Set Update signaling illustrated at times (2), (6), and (7), may be utilized. That is, in an aspect of the present disclosure, without altering the Active Set, the RNC 708 may make a decision to remove the secondary serving HS-DSCH cell and switch off a Multi-Point HSDPA mode. As such, the RNC 708 may utilize NBAP to provide Radio Link Reconfiguration messages to Cell 1 704 and Cell 2 706 as illustrated at time (3); and provide the PCR message to the UE 702, as illustrated at time (4). Here, the PCR message may exclude the IE indicating to the UE the secondary cell information. In this way, because the UE is configured in a Multi-Point HSDPA mode, the UE may interpret the exclusion of the secondary cell information in the PCR message as an indicator to switch off the Multi-Point HSDPA mode.

In a further aspect of the present disclosure, the mobility event called Event 1D, as described above, may be utilized to re-select the serving HS-DSCH cell. In accordance with some aspects of the present disclosure, one or more of the RRC messages utilized for this mobility event can include a new or modified IE to enable the swapping of the primary and the secondary serving HS-DSCH cells. That is, upon the occurrence of the measurement event that indicates that the secondary serving HS-DSCH cell exceeds the quality of the primary serving HS-DSCH cell, aspects of the present disclosure may provide for a swapping of the primary and secondary serving HS-DSCH cells.

Figure 7C:
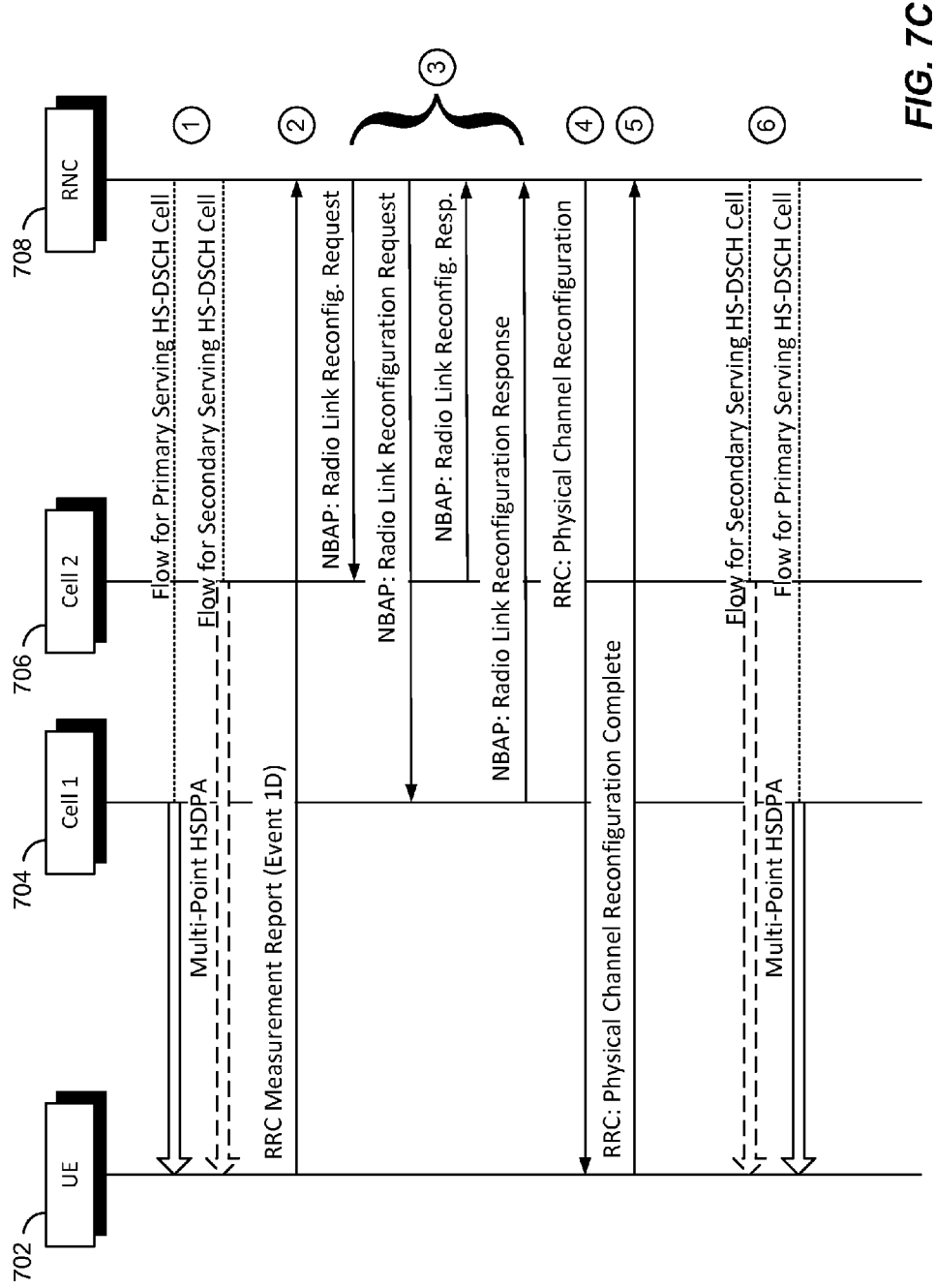
FIG. 7C is a call flow diagram illustrating a swapping of a primary serving cell and a secondary serving cell during an Event 1D procedure.

FIG. 7C is a simplified call flow diagram illustrating some of the signaling among nodes for an Event 1D in accordance with an aspect of the present disclosure. In the illustration, at time (1) Cell 1, 704, acts as a primary serving HS-DSCH cell for the UE 702, and Cell 2, 706, acts as a secondary serving HS-DSCH cell for the UE 702 in a Multi-Point HSDPA system. At time (2), based on a measurement result that determines that Cell 2, 706, exceeds Cell 1, 704, e.g., in terms of its CPICH $E_c/I_0$, the UE 502 may transmit an RRC Measurement Report message including Event 1D. In some aspects of the present disclosure, the RRC Measurement Report message may include an IE corresponding to an indication that the UE 702 is in Multi-Point HSDPA mode and the event is intended to swap the primary and secondary serving HS-DSCH cells. In another aspect of the present disclosure, the RRC Measurement Report message may be the same as one utilized in a conventional Serving Cell Change in a single-cell HSDPA system, as illustrated in FIG. 5C.

At time (3), over NBAP, the RNC 708 may communicate with Cell 1, 704, and Cell 2, 706, utilizing Radio Link Reconfiguration messages to reconfigure the radio links with the respective cells. This reconfiguration may include mapping each cell in HS-DPCCH feedback. In some aspects of the present disclosure queue transfers between Cell 1, 704, and Cell 2, 706, may be utilized, but in other aspects of the present disclosure such queue transfers may not be required. That is, although the primary and secondary serving cells may switch places, data that was queued at a first Node B as the primary serving cell may continue to be transmitted to the UE as the secondary serving cell after the Event 1D mobility event. Similarly, data that was queued at a second Node B as the secondary serving cell may continue to be transmitted to the UE as the primary serving cell after the Event 1D mobility event.

At time (4) the RNC 708 may send an RRC Physical Channel Reconfiguration message to the UE 702 to confirm the serving cell change. In an aspect of the present disclosure, the RRC Physical Channel Reconfiguration message may include an IE configured to inform the UE 702 that the primary serving HS-DSCH cell and the secondary serving HS-DSCH cell are on the same carrier. Further, in an aspect of the present disclosure, the RRC Physical Channel Reconfiguration message may be sent to the UE 702 from both Cell 1, 704, and Cell 2, 706. Thus, the UE 702 may interpret this IE as an indication to switch the primary and secondary serving HS-DSCH cells in the Multi-Point HSDPA system.

Here, at an activation time, the UE 702 may map the CQI and HARQ ACK/NACK from Cell 2, 706 (i.e., the former secondary serving HS-DSCH cell) to the stream corresponding to Cell 1, 704 (i.e., the new secondary serving HS-DSCH cell), and map the CQI and HARQ ACK/NACK from Cell 1, 704 (i.e., the former primary serving HS-DSCH cell) to the stream corresponding to Cell 2, 706 (i.e., the new primary serving HS-DSCH cell). Further, the respective Node Bs may flush their HARQ buffers without resetting the MAC-ehs entity. The RNC 708 may additionally adjust any priority assigned to the respective cells at this time.

At time (5) the UE 702 may send an RRC Physical Channel Configuration Message Complete message to the RNC 708 indicating that the switching of the primary serving HS-DSCH cell and the secondary serving HS-DSCH cell is complete. Thus, at time (6), Multi-Point HSDPA service may resume with the switched primary and secondary serving HS-DSCH cells.

In some aspects of the present disclosure, a decision to switch on and off of the Multi-Point HSDPA mode can depend on various factors including but not limited to loading conditions of the cell and battery conditions of the UE. For example, in one aspect, a decision may be made to switch on the Multi-Point HSDPA mode and aggregate a plurality of downlink cells for a UE when a large amount of data is directed to the UE. This way, with the aggregation of the plural downlinks an increased throughput may be enabled. In another aspect of the present disclosure, when a battery level for the UE is low, e.g., at or below a certain threshold (e.g., a predetermined threshold), this factor may reduce the likelihood or eliminate the possibility of turning on the Multi-Point HSDPA mode, since such a mode may utilize an increased amount of power relative to single downlink service.

The discussion above largely emphasizes various scenarios with up to two cells in a UE's Active Set. For example, adding a second cell to the Active Set and making that cell a secondary serving HS-DSCH cell; swapping the primary serving HS-DSCH cell and the secondary serving HS-DSCH cell; and de-activating a secondary serving HS-DSCH cell and removing that cell from the Active Set to reduce the Active Set to one cell. However, an Active Set for a particular UE may not be limited to a size of two cells, but may include three or more cells. While some of the above scenarios can be effective and broadly applied to any number of cells in an active set, certain additional scenarios also should be taken into account.

For example, when a UE has a Multi-Point HSDPA mode active, the UE is served by two cells, and therefore has at least two cells in its Active Set. Here, if its Active Set has a size of two cells, a third cell may be added to the Active Set. Such a scenario brings a number of possibilities to be handled with various mobility events. For example, a conventional Event 1A may be utilized to add the third cell to the Active Set, while the primary and secondary serving cells remain unchanged. Additionally, a combination of Event 1A and Event 1D may be utilized to add the third cell to the Active Set, while the primary and secondary serving cells swap positions to become the secondary and primary serving cells, respectively.

However, according to an aspect of the present disclosure, a new mobility event may be utilized to add the third cell to the Active Set, and to replace the secondary serving cell. That is, in a situation where a non-serving cell becomes stronger than the secondary serving cell, a Measurement Report message may be triggered to inform the RNC that there is a potential change to the secondary serving cell. Thus, an aspect of the present disclosure introduces a measurement identity for measuring the CPICH of non-serving cells and comparing the strength of those cells with that of the current secondary serving cell, as well as the current primary serving cell. Here, if any of the non-serving cells is stronger than the current secondary serving cell, a Measurement Report message may be triggered. Here, in one example, the RRC Measurement Report message may include an indication of the new mobility event, and may further identify the new cell to be added to the Active Set. In response, the RNC may utilize NBAP to reconfigure radio links with the secondary serving cell and the third cell, and if necessary reconfigure the primary serving cell, such that the third cell becomes the new secondary serving cell and the former secondary serving cell ceases serving the UE as the secondary serving cell but may remain in the Active Set. In some examples, the new mobility event may utilize conventional Active Set Update signaling to modify the Active Set to include the third cell. Further, in some examples, a Physical Channel Reconfiguration message may be sent to the UE to confirm the change of the secondary serving cell.

In some aspects of the disclosure the UE may include dual MAC and PHY entities for communicating over the air interface with the primary and secondary serving cell, respectively. That is, the UE may include dual receive chains for receiving the downlink signals over the air interface from the respective primary and secondary serving cells. Further, the UE may be capable of configuring its MAC layer to include dual MAC entities for multiplexing between the logical channels and the transport channels in the UE. Here, the UE may redirect the MAC and PHY corresponding to the secondary serving cell to the third cell, which acts as the new secondary serving cell. Further, if the former secondary serving cell has an ongoing data stream at the time of the trigger event, it may be desirable to transfer this ongoing data to the third cell to act as the new secondary serving cell, to enable a relatively smooth transition. Thus, in an aspect of the present disclosure, a queue transfer may take place from the former secondary serving cell to the third cell, acting as the new secondary serving cell.

Another scenario includes a UE in the Multi-Point HSDPA mode, with a primary serving cell and a secondary serving cell, with one or more non-serving cells in its Active Set. Here, changes to the ranking of the CPICH $E_c/I_0$ measurements may cause changes within the Active Set as to which of the cells are most suitable to be the primary and secondary serving cells. Here, the mobility event described above for adding a new cell to the Active Set to replace the secondary serving cell may be utilized. That is, the new trigger event may be triggered when another cell within the Active Set exceeds the quality of the current secondary serving cell. Additionally, mobility events may be utilized to replace the primary serving cell, or essentially any other desired change to the primary serving cell, secondary serving cell, and other cells in the Active Set.

Figure 8:
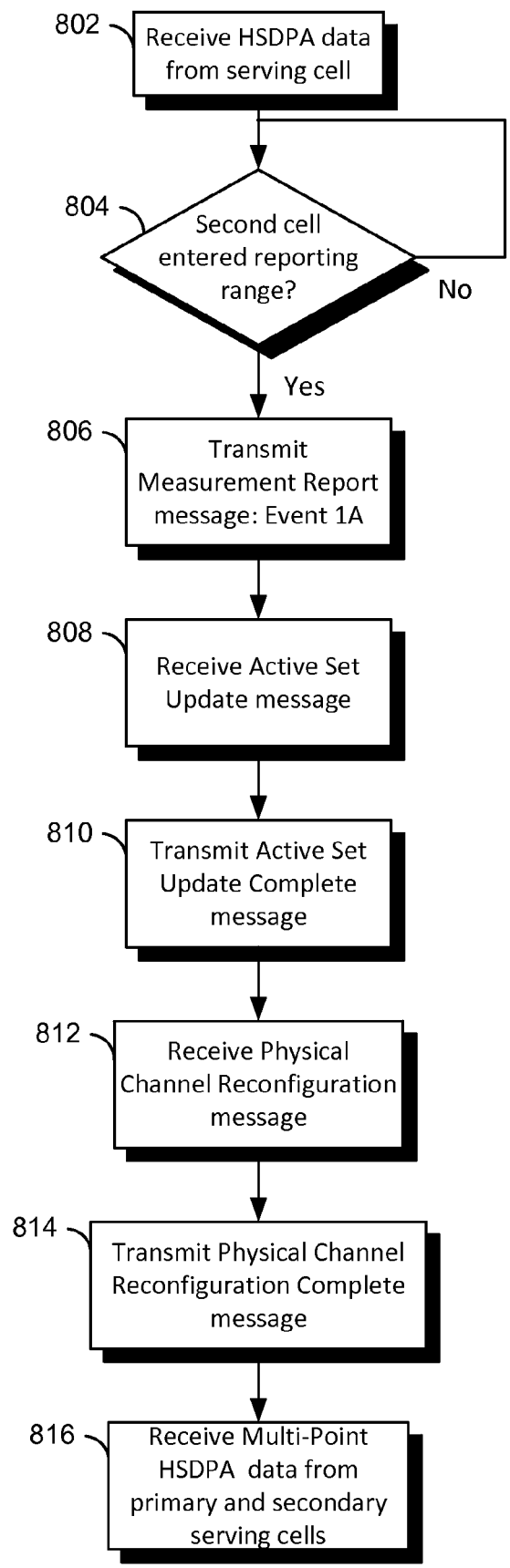
FIG. 8 is a flow chart illustrating a process for a UE for switching on a Multi-Point HSDPA mode during an Event 1A procedure.

FIG. 8 is a flow chart illustrating a process for a UE for switching on a Multi-Point HSDPA mode during an Event 1A procedure in accordance with some aspects of the present disclosure. In some aspects, the illustrated process may be performed by a processor 104 as illustrated in FIG. 1. In some aspects, the illustrated process may be performed by a UE such as the UE 210 illustrated in FIG. 2. In other aspects of the disclosure, the illustrated process may be performed by any suitable apparatus for wireless communication. For example, the process illustrated in FIG. 8 may correspond to the call flow diagram illustrated in FIG. 7A.

In block 802, the process may receive at the UE HSDPA data from a serving cell. For example, the UE may have a MAC entity configured to receive the HS-DSCH downlink from a first Node B. In block 804, the process may determine whether a second cell has entered a reporting range. For example, this may correspond to a situation wherein a measurement of an $E_c/I_0$ value of a CPICH transmitted by the second cell is above a certain threshold. If no, then the process may return to receiving the HSDPA data from the serving cell. If yes, the process may proceed to block 806, wherein the UE may transmit a Measurement Report message indicating Event 1A and identifying the second cell. In block 808, the process may receive an Active Set Update message from the RNC at the UE, indicating to add the second cell to the Active Set. In block 810, the process may transmit from the UE an Active Set Update Complete message indicating a completion of the updating of the Active Set.

In block 812, the process may receive at the UE a Physical Channel Reconfiguration message. Here, in an aspect of the present disclosure, the PCR message may include an information element for informing the UE about one or more characteristics of the secondary serving cell, e.g., that the secondary serving cell will utilize the same carrier as the primary serving cell. For example, the PCR message may include the IE "Downlink Secondary Cell Info FDD." In block 814, the process may transmit a Physical Channel Reconfiguration Complete message from the UE to the RNC confirming the completion of the secondary serving cell reception. Thus, in block 816, with Multi-Point HSDPA mode switched on, the UE may receive Multi-Point HSDPA data from the new primary serving cell and secondary serving cell.

Figure 9:
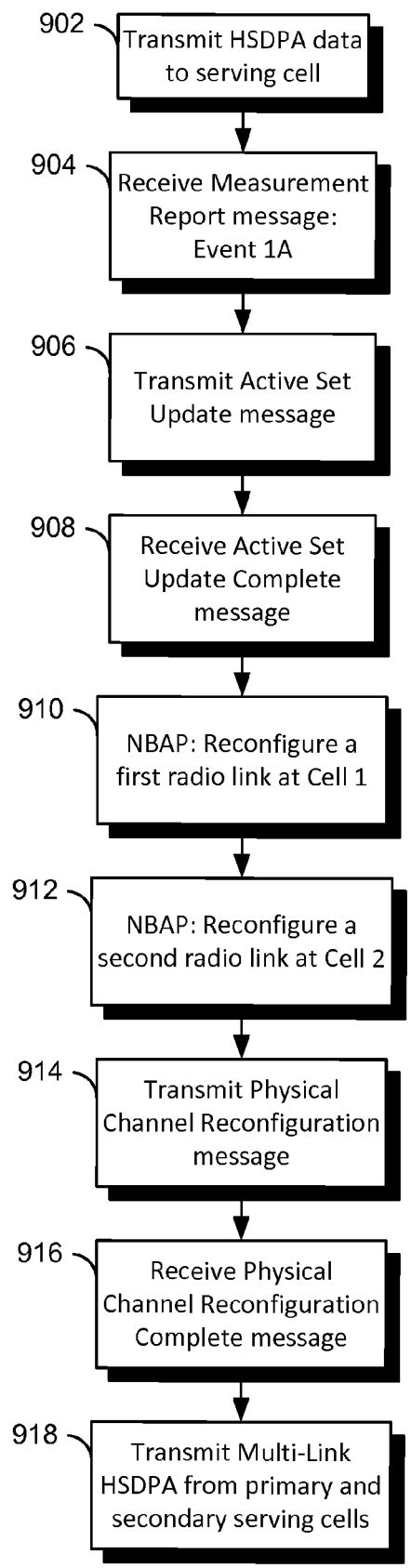
FIG. 9 is a flow chart illustrating a process for an RNC for switching on a Multi-Point HSDPA mode during an Event 1A procedure.

FIG. 9 is a flow chart illustrating a process for an RNC for switching on a Multi-Point HSDPA mode during an Event 1A procedure in accordance with some aspects of the present disclosure. In some aspects, the illustrated process may be performed by a processor 104 as illustrated in FIG. 1. In some aspects, the illustrated process may be performed by an RNC such as the RNC 206 illustrated in FIG. 2. In other aspects of the disclosure, the illustrated process may be performed by any suitable apparatus for wireless communication. For example, the process illustrated in FIG. 9 may correspond to the call flow diagram illustrated in FIG. 7A.

In block 902, the process may transmit HSDPA data to a serving cell, e.g., over an Iub interface. Here, the serving cell may be a Node B such as the Node B 208 illustrated in FIG. 2. In block 904, the process may receive a Measurement Report message from the UE indicating Event 1A and identifying a cell that has entered a reporting range. In block 906, the process may transmit an Active Set Update message to the UE indicating to add the identified cell to the Active Set. In block 908, the process may receive from the UE an Active Set Update Complete message indicating a completion of the updating of the Active Set.

In block 910, the process may utilize NBAP signaling to reconfigure a first radio link at a first Node B corresponding to the HSDPA serving cell, such that it can act as a primary serving cell in a Multi-Point HSDPA mode. In block 912, the process may utilize the NBAP signaling to reconfigure a second radio link at a second Node B corresponding to the identified cell, such that it can act as a secondary serving cell in the Multi-Point HSDPA mode. In block 914, the process may transmit a Physical Channel Reconfiguration message to the UE. Here, in an aspect of the present disclosure, the PCR message may include an information element for informing the UE about one or more characteristics of the secondary serving cell, e.g., that the secondary serving cell will utilize the same carrier as the primary serving cell. For example, the PCR message may include the IE "Downlink Secondary Cell Info FDD." In block 916, the process may receive a Physical Channel Reconfiguration Complete message at the RNC from the UE, confirming the completion at the UE of the secondary serving cell reception. Thus, in block 918, the process may transmit Multi-Point HSDPA data utilizing the primary and secondary serving cells in the Multi-Point HSDPA mode.

Figure 10:
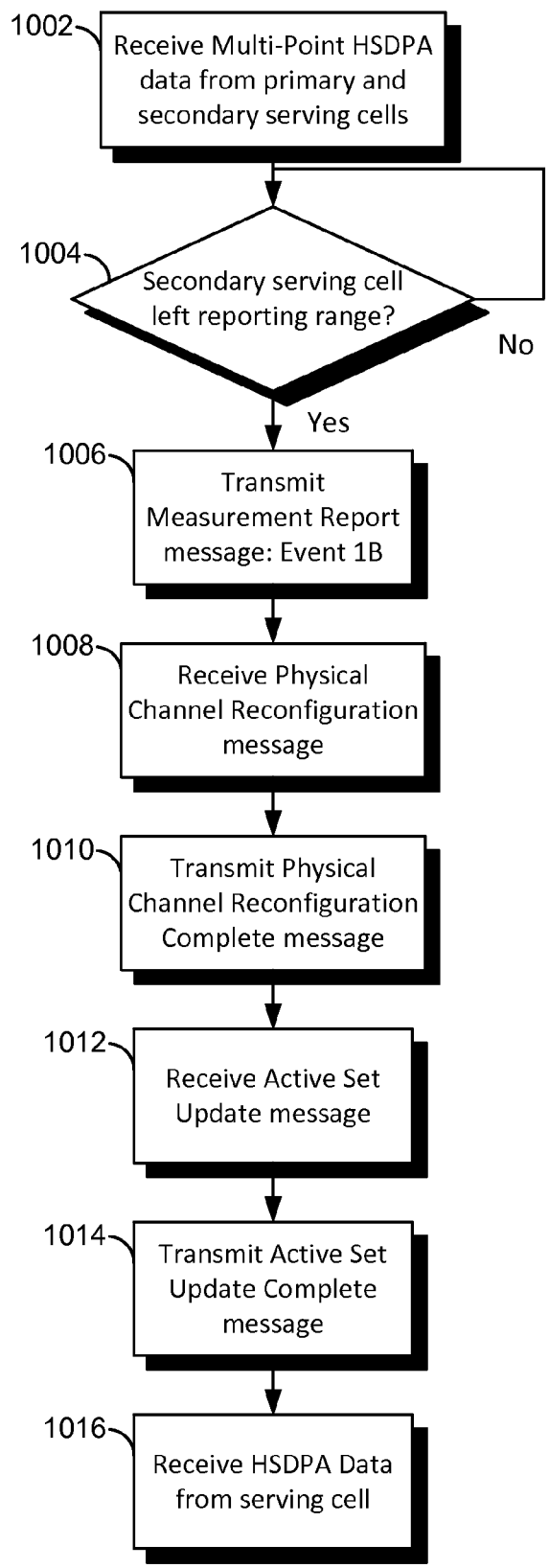
FIG. 10 is a flow chart illustrating a process for a UE for switching off a Multi-Point HSDPA mode during an Event 1B procedure.

FIG. 10 is a flow chart illustrating a process for a UE for switching off a Multi-Point HSDPA mode during an Event 1B procedure in accordance with some aspects of the present disclosure. In some aspects, the illustrated process may be performed by a processor 104 as illustrated in FIG. 1. In some aspects, the illustrated process may be performed by a UE such as the UE 210 illustrated in FIG. 2. In other aspects of the disclosure, the illustrated process may be performed by any suitable apparatus for wireless communication. For example, the process illustrated in FIG. 10 may correspond to the call flow diagram illustrated in FIG. 7B.

In block 1002, the process may receive at the UE Multi-Point HSDPA data from a primary serving cell and a secondary serving cell. For example, the UE may have dual MAC entities configured to receive the HS-DSCH downlink from a first Node B and a second Node B, respectively. In block 1004, the process may determine whether the secondary serving cell has left a reporting range. For example, this may correspond to a situation wherein a measurement of an $E_c/I_0$ value of a CPICH transmitted by the second cell is below a certain threshold. If no, then the process may return to receiving the Multi-Point HSDPA data from the primary and secondary serving cells. If yes, the process may proceed to block 1006, wherein the UE may transmit a Measurement Report message indicating Event 1B and identifying the second cell. In block 1008, the process may receive a Physical Channel Reconfiguration message. Here, in an aspect of the present disclosure, the PCR message may exclude an information element for informing the UE about one or more characteristics of the secondary serving cell, e.g., that the secondary serving cell utilizes the same carrier as the primary serving cell. For example, the PCR message may specifically exclude the IE "Downlink Secondary Cell Info FDD," such that the UE may interpret this exclusion as an indication that the Multi-Point HSDPA mode will be switched off. In block 1010, the process may transmit from the UE a Physical Channel Reconfiguration Complete message confirming the completion of the removal of the secondary serving cell. In block 1012, the process may receive at the UE an Active Set Update message indicating to remove the former secondary serving cell from the Active Set, and in block 1014, the process may transmit from the UE an Active Set Update Complete message indicating a completion of the updating of the Active Set. Thus, in block 1016, with the Multi-Point HSDPA mode switched off, the process may receive at the UE HSDPA data from the new HS-DSCH serving cell, which was formerly the primary serving cell.

Figure 11:
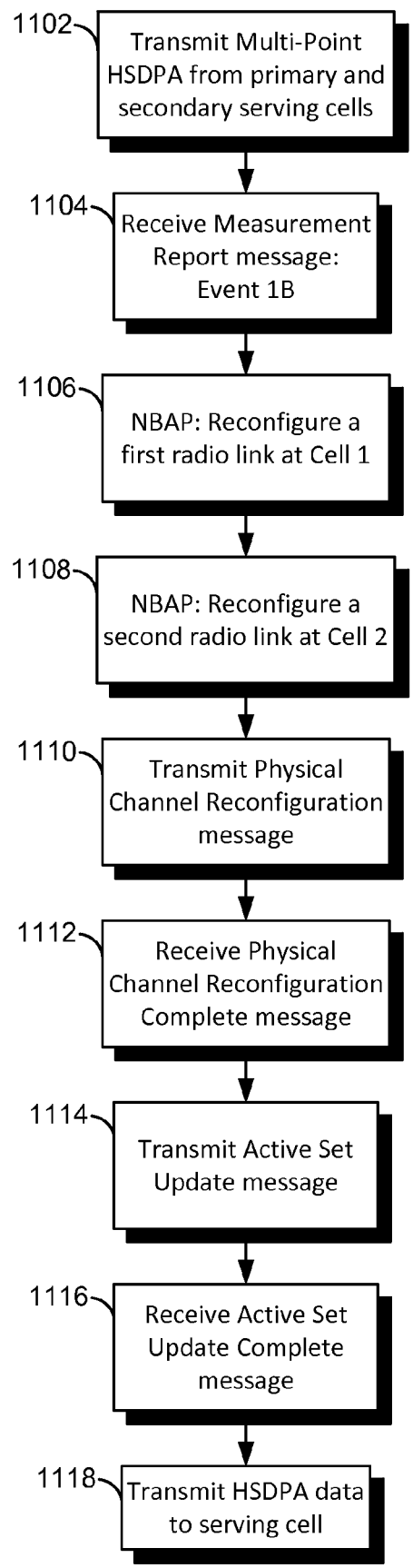
FIG. 11 is a flow chart illustrating a process for an RNC for switching off a Multi-Point HSDPA mode during an Event 1B procedure.

FIG. 11 is a flow chart illustrating a process for an RNC for switching off a Multi-Point HSDPA mode during an Event 1B procedure in accordance with some aspects of the present disclosure. In some aspects, the illustrated process may be performed by a processor 104 as illustrated in FIG. 1. In some aspects, the illustrated process may be performed by an RNC such as the RNC 206 illustrated in FIG. 2. In other aspects of the disclosure, the illustrated process may be performed by any suitable apparatus for wireless communication. For example, the process illustrated in FIG. 11 may correspond to the call flow diagram illustrated in FIG. 7B.

In block 1102, the process may transmit Multi-Point HSDPA data to a UE by way of a primary serving cell and a secondary serving cell, e.g., utilizing an Iub interface. Here, the primary serving cell and the secondary serving cell may each be Node Bs such as the Node Bs 208 illustrated in FIG. 2. In block 1104, the process may receive a Measurement Report message from the UE indicating Event 1B. In block 1106, the process may utilize NBAP signaling to reconfigure a first radio link at a first Node B corresponding to the primary serving cell, e.g., to inform the first Node B of the termination of the secondary serving cell and to prepare it for an HS-DPCCH format change corresponding to a switching off of the Multi-Point HSDPA mode. In block 1108, the process may utilize the NBAP signaling to inform the secondary serving cell to terminate the HS channels, e.g., to reconfigure a second radio link at a second Node B corresponding to the secondary serving cell and switch off the Multi-Point HSDPA mode. Here, the second Node B may flush its queue of data addressed to the UE.

In block 1110, the process may transmit a Physical Channel Reconfiguration message to the UE. Here, in an aspect of the present disclosure, the PCR message may exclude an information element for informing the UE about one or more characteristics of the secondary serving cell, e.g., that the secondary serving cell will utilize the same carrier as the primary serving cell. For example, the PCR message may include the IE "Downlink Secondary Cell Info FDD." In block 1112, the process may receive a Physical Channel Reconfiguration Complete message at the RNC from the UE, confirming the completion at the UE of the swapping of the primary serving cell and the secondary serving cell.

In block 1114, the process may transmit an Active Set Update message to the UE indicating to delete the former secondary serving cell from the Active Set. In block 1116, the process may receive from the UE an Active Set Update Complete message indicating a completion of the updating of the Active Set. Thus, in block 1118, the process may transmit from the RNC, utilizing the first Node B as the HSDPA serving cell, HSDPA data to the UE.

Figure 12:
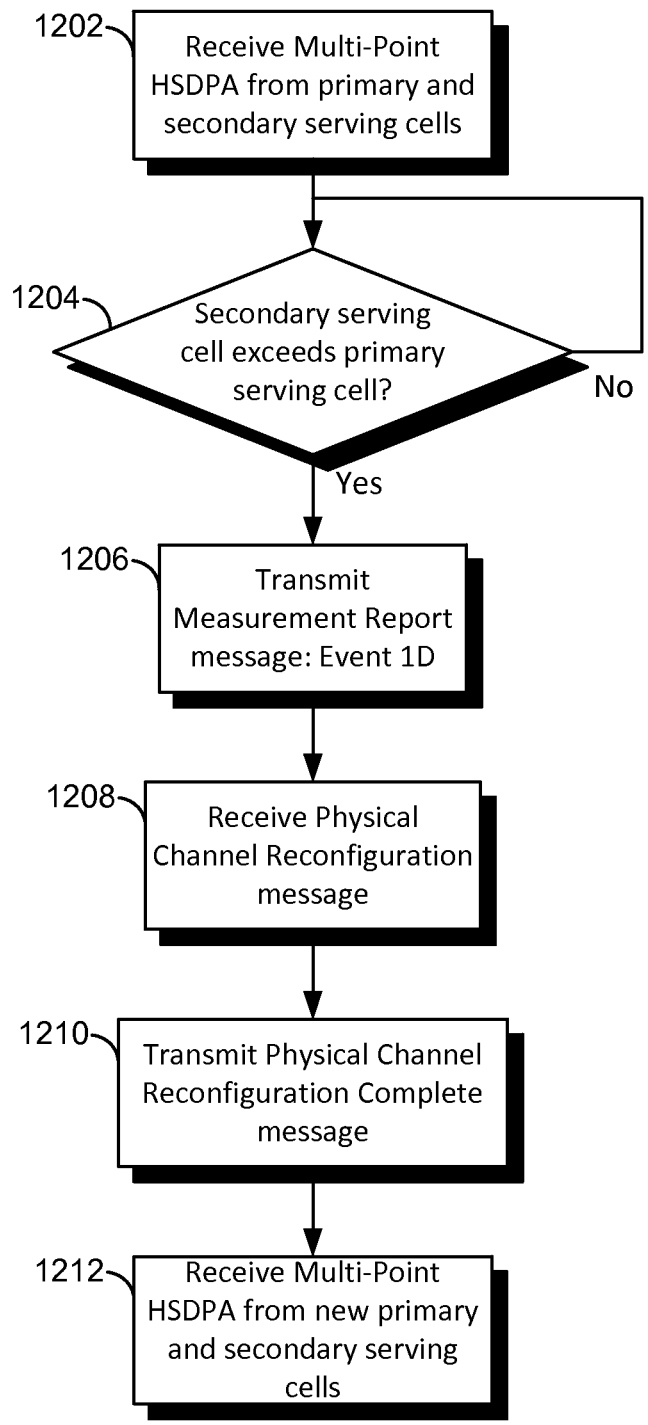
FIG. 12 is a flow chart illustrating a process for a UE for swapping a primary serving cell and a secondary serving cell during an Event 1D procedure.

FIG. 12 is a flow chart illustrating a process for a UE for swapping a primary serving cell and a secondary serving cell during an Event 1D procedure in accordance with some aspects of the present disclosure. In some aspects, the illustrated process may be performed by a processor 104 as illustrated in FIG. 1. In some aspects, the illustrated process may be performed by a UE such as the UE 210 illustrated in FIG. 2. In other aspects of the disclosure, the illustrated process may be performed by any suitable apparatus for wireless communication. For example, the process illustrated in FIG. 10 may correspond to the call flow diagram illustrated in FIG. 7C.

In block 1202, the process may receive at the UE Multi-Point HSDPA data from a primary serving cell and a secondary serving cell. For example, the UE may have dual MAC entities configured to receive the HS-DSCH downlink from a first Node B and a second Node B, respectively. In block 1204, the process may determine whether the secondary serving exceeds the primary serving cell. For example, this may correspond to a situation wherein a measurement of an $E_c/I_0$ value of a CPICH transmitted by the secondary serving cell is higher than a measurement of the $E_c/I_0$ value of a CPICH transmitted by the primary serving cell. If no, then the process may return to receiving the Multi-Point HSDPA data from the primary and secondary serving cells. If yes, the process may proceed to block 1206, wherein the UE may transmit a Measurement Report message indicating Event 1D. In block 1208, the process may receive a Physical Channel Reconfiguration message. Here, in an aspect of the present disclosure, the PCR message may include an information element for informing the UE about one or more characteristics of the secondary serving cell, e.g., that the secondary serving cell utilizes the same carrier as the primary serving cell. For example, the PCR message may include the IE "Downlink Secondary Cell Info FDD," such that the UE may interpret this IE as an indication that the primary and secondary serving cells are to be swapped. In block 1210, the process may transmit from the UE a Physical Channel Reconfiguration Complete message confirming the completion of the swap of the primary and the secondary serving cell. Thus, in block 1212, the process may receive at the UE Multi-Point HSDPA data from the newly swapped primary and secondary serving cell.

Figure 13:
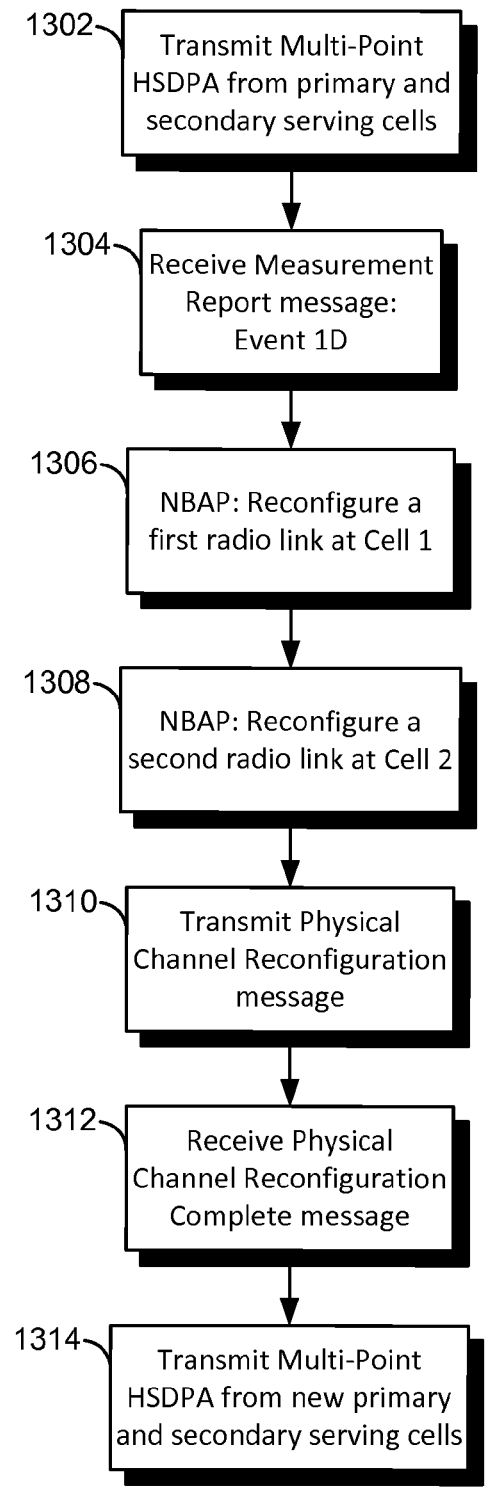
FIG. 13 is a flow chart illustrating a process for an RNC for swapping a primary serving cell and a secondary serving cell during an Event 1D procedure.

FIG. 13 is a flow chart illustrating a process for an RNC for swapping a primary serving cell and a secondary serving cell during an Event 1D procedure in accordance with some aspects of the present disclosure. In some aspects, the illustrated process may be performed by a processor 104 as illustrated in FIG. 1. In some aspects, the illustrated process may be performed by an RNC such as the RNC 206 illustrated in FIG. 2. In other aspects of the disclosure, the illustrated process may be performed by any suitable apparatus for wireless communication. For example, the process illustrated in FIG. 13 may correspond to the call flow diagram illustrated in FIG. 7C.

In block 1302, the process may transmit Multi-Point HSDPA data to a UE by way of a primary serving cell and a secondary serving cell, e.g., utilizing an Iub interface. Here, the primary serving cell and the secondary serving cell may each be Node Bs such as the Node Bs 208 illustrated in FIG. 2. In block 1304, the process may receive a Measurement Report message from the UE indicating Event 1D. In block 1306, the process may utilize NBAP signaling to reconfigure a first radio link at a first Node B corresponding to the primary serving cell, such that it can act as a new secondary serving cell in the Multi-Point HSDPA mode. In block 1308, the process may utilize the NBAP signaling to reconfigure a second radio link at a second Node B corresponding to the secondary serving cell, such that it can act as a new primary serving cell in the Multi-Point HSDPA mode.

In block 1310, the process may transmit a Physical Channel Reconfiguration message to the UE. Here, in an aspect of the present disclosure, the PCR message may include an information element for informing the UE about one or more characteristics of the secondary serving cell, e.g., that the secondary serving cell will utilize the same carrier as the primary serving cell. For example, the PCR message may include the IE "Downlink Secondary Cell Info FDD." In block 1312, the process may receive a Physical Channel Reconfiguration Complete message at the RNC from the UE, confirming the completion at the UE of the swapping of the primary serving cell and the secondary serving cell. Thus, in block 1314, the process may transmit the Multi-Point HSDPA data from the newly swapped primary and secondary serving cells.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication for a User Equipment (UE) that is configured with a Multi-Point High Speed Data Packet Access (HSDPA) mode utilizing a primary serving cell and a secondary serving cell, the method comprising:
  receiving Multi-Point HSDPA data from a first cell as the primary serving cell and a second cell as the secondary serving cell;
  determining that a measurement of the secondary serving cell exceeds a measurement of the primary serving cell;
  transmitting a request corresponding to the measurement of the secondary serving cell;
  receiving a Radio Resource Control (RRC) message in response to the request, wherein the RRC message includes an information element configured to inform the UE that the secondary serving cell utilizes the same carrier frequency as that of the primary serving cell;
  transmitting a response to the RRC message to confirm completion of a reconfiguration in accordance with the RRC message; and
  receiving Multi-Point HSDPA data from the second cell as the primary serving cell and the first cell as the secondary serving cell in response to the reconfiguration.

2. The method of claim 1, wherein the reconfiguration comprises a switching on of the Multi-Point HSDPA mode to receive downlink data from the primary serving cell and the secondary serving cell.

3. The method of claim 1, further comprising:
  receiving HSDPA data from the first cell;
  determining that a measurement of the second cell is above a threshold;
  transmitting a request corresponding to the measurement; and
  receiving Multi-Point HSDPA data from the first cell as the primary serving cell and the second cell as the secondary serving cell.

4. The method of claim 3, wherein the reconfiguration comprises a switching on of the Multi-Point HSDPA mode, and
  wherein the request corresponding to the measurement comprises an indication of Event 1A.

5. The method of claim 1, wherein the reconfiguration comprises a swapping of the primary serving cell with the secondary serving cell.

6. The method of claim 1, wherein the reconfiguration comprises a swapping of the primary serving cell with the secondary serving cell; and
  wherein the request corresponding to the measurement comprises an indication of Event 1D.

7. The method of claim 1, further comprising:
  transmitting an RRC Connection Request message including an information element indicating support for the Multi-Point HSDPA mode.

8. The method of claim 1, further comprising:
  utilizing an identifier to indicate support for Multi-Point HSDPA, wherein the identifier comprises one of an International Mobile Subscriber Identity (IMSI) or a Packet Temporary Mobile Subscriber Identity (P-TMSI).

9. A method of wireless communication, comprising:
  receiving Multi-Point High Speed Data Packet Access (HSDPA) data from a primary serving cell and a secondary serving cell;
  determining that a measurement of the secondary serving cell has fallen below a threshold;
  transmitting a request corresponding to the measurement of the secondary serving cell;
  receiving an Radio Resource Control (RRC) message that excludes a downlink secondary cell information element in response to transmitting the request; and
  switching off a Multi-Point HSDPA mode such that an High Speed-Downlink Shared Channel (DS-DSCH) is not received from the secondary serving cell.

10. The method of claim 9, further comprising:
  removing a cell corresponding to the secondary serving cell from an Active Set.

11. The method of claim 9, wherein the request corresponding to the measurement comprises an indication of Event 1B.

12. The method of claim 9, further comprising:
  transmitting an RRC Connection Request message including an information element indicating support for the Multi-Point HSDPA mode.

13. The method of claim 9, further comprising:
  utilizing an identifier to indicate support for Multi-Point HSDPA, wherein the identifier comprises one of an International Mobile Subscriber Identity (IMSI) or a Packet Temporary Mobile Subscriber Identity (P-TMSI).

14. A method of wireless communication for a Radio Network Controller (RNC) that is configured with supporting a Multi-Point High Speed Data Packet Access (HSDPA) mode utilizing a primary serving cell and a secondary serving cell, the method comprising:
  transmitting Multi-Point HSDPA data from a first cell as the primary serving cell and a second cell as the secondary serving cell;
  receiving a request corresponding to a measurement of the secondary serving cell exceeding a measurement of the primary serving cell;
  transmitting a Radio Resource Control (RRC) message in response to the request, wherein the RRC message includes an information element configured to inform a UE that the secondary serving cell utilizes the same carrier frequency as that of the primary serving cell;
  receiving a response to the RRC message to confirm completion of a reconfiguration in accordance with the RRC message; and transmitting Multi-Point HSDPA data from the second cell as the primary serving cell and the first cell as the secondary serving cell in response to the reconfiguration.

15. The method of claim 14, wherein the reconfiguration comprises:
reconfiguring a second radio link corresponding to a second Node B to set up the second radio link corresponding to the second Node B as the secondary serving cell in the Multi-Point HSDPA mode; and
reconfiguring a first radio link corresponding to a first Node B corresponding to a serving cell, to set up the first radio link corresponding to the first Node B as the primary serving cell in the Multi-Point HSDPA mode.

16. The method of claim 14, wherein the reconfiguration comprises a switching on of the Multi-Point HSDPA mode to transmit downlink data by way of the primary serving cell and the secondary serving cell.

17. The method of claim 14, wherein the reconfiguration comprises a swapping of the primary serving cell with the secondary serving cell, such that the first cell that acted as a former primary serving cell acts as a new secondary serving cell and the second cell that acted as a former secondary serving cell acts as a new primary serving cell.

18. The method of claim 17, further comprising:
continuing to receive data from the new primary serving cell that was previously queued at a Node B corresponding to the former secondary serving cell; and
continuing to receive data from the new secondary serving cell that was previously queued at the Node B corresponding to the former primary serving cell.

19. A User Equipment (UE) configured with a Multi-Point High Speed Data Packet Access (HSDPA) mode utilizing a primary serving cell and a secondary serving cell, the UE comprising:
means for receiving Multi-Point HSDPA data from a first cell as the primary serving cell and a second cell as the secondary serving cell;
means for determining that a measurement of the secondary serving cell exceeds a measurement of the primary serving cell;
means for transmitting a request corresponding to the measurement of the secondary serving cell;
means for receiving a Radio Resource Control (RRC) message in response to the request, wherein the RRC message includes an information element configured to inform the UE that the secondary serving cell utilizes the same carrier frequency as that of the primary serving cell;
means for transmitting a response to the RRC message to confirm completion of a reconfiguration in accordance with the RRC message; and
means for receiving Multi-Point HSDPA data from the second cell as the primary serving cell and the first cell as the secondary serving cell in response to the reconfiguration.

20. The UE of claim 19, wherein the reconfiguration comprises a switching on of the Multi-Point HSDPA mode to receive downlink data from the primary serving cell and the secondary serving cell.

21. The UE of claim 19, further comprising:
means for receiving HSDPA data from the first cell;
means for determining that a measurement of the second cell is above a threshold;
means for transmitting a request corresponding to the measurement; and
means for receiving Multi-Point HSDPA data from the first cell as the primary serving cell and the second cell as the secondary serving cell.

22. The UE of claim 21, wherein the reconfiguration comprises a switching on of the Multi-Point HSDPA mode, and wherein the request corresponding to the measurement comprises an indication of Event 1A.

23. The UE of claim 19, wherein the reconfiguration comprises a swapping of the primary serving cell with the secondary serving cell.

24. The UE of claim 19, wherein the reconfiguration comprises a swapping of the primary serving cell with the secondary serving cell; and
wherein the request corresponding to the measurement comprises an indication of Event 1D.

25. The UE of claim 19, further comprising:
means for transmitting an RRC Connection Request message including an information element indicating support for the Multi-Point HSDPA mode.

26. The UE of claim 19, further comprising:
means for utilizing an identifier to indicate support for Multi-Point HSDPA, wherein the identifier comprises one of an International Mobile Subscriber Identity (IMSI) or a Packet Temporary Mobile Subscriber Identity (P-TMSI).

27. An apparatus for wireless communication, comprising:
means for receiving Multi-Point High Speed Data Packet Access (HSDPA) data from a primary serving cell and a secondary serving cell;
means for determining that a measurement of the secondary serving cell has fallen below a threshold;
means for transmitting a request corresponding to the measurement of the secondary serving cell;
means for receiving an Radio Resource Control (RRC) message that excludes a downlink secondary cell information element in response to transmitting the request; and
means for switching off a Multi-Point HSDPA mode such that an High Speed-Downlink Shared Channel (DS-DSCH) is not received from the secondary serving cell.

28. The apparatus of claim 27, further comprising:
means for removing a cell corresponding to the secondary serving cell from an Active Set.

29. The apparatus of claim 27, wherein the request corresponding to the measurement comprises an indication of Event 1B.

30. The apparatus of claim 27, further comprising:
means for transmitting an RRC Connection Request message including an information element indicating support for the Multi-Point HSDPA mode.

31. The apparatus of claim 27, further comprising:
means for utilizing an identifier to indicate support for Multi-Point HSDPA, wherein the identifier comprises one of an International Mobile Subscriber Identity (IMSI) or a Packet Temporary Mobile Subscriber Identity (P-TMSI).

32. A Radio Network Controller (RNC) configured to support a Multi-Point High Speed Data Packet Access (HSDPA) mode utilizing a primary serving cell and a secondary serving cell, the RNC comprising:
means for transmitting Multi-Point HSDPA data from a first cell as the primary serving cell and a second cell as the secondary serving cell;
means for receiving a request corresponding to a measurement of the secondary serving cell exceeding a measurement of the primary serving cell;

means for transmitting a Radio Resource Control (RRC) message in response to the request, wherein the RRC message includes an information element configured to inform a UE that the secondary serving cell utilizes the same carrier frequency as that of the primary serving cell;

means for receiving a response to the RRC message to confirm completion of a reconfiguration in accordance with the RRC message; and means for transmitting Multi-Point HSDPA data from the second cell as the primary serving cell and the first cell as the secondary serving cell in response to the reconfiguration.

33. The RNC of claim 32, wherein the reconfiguration comprises:

means for reconfiguring a second radio link corresponding to a second Node B to set up the second radio link corresponding to the second Node B as the secondary serving cell in the Multi-Point HSDPA mode; and means for reconfiguring a first radio link corresponding to a first Node B corresponding to a serving cell, to set up the first radio link corresponding to the first Node B as the primary serving cell in the Multi-Point HSDPA mode.

34. The RNC of claim 32, wherein the reconfiguration comprises a switching on of the Multi-Point HSDPA mode to transmit downlink data by way of the primary serving cell and the secondary serving cell.

35. The RNC of claim 32, wherein the reconfiguration comprises a swapping of the primary serving cell with the secondary serving cell, such that the first cell that acted as a former primary serving cell acts as a new secondary serving cell and the second cell that acted as a former secondary serving cell acts as a new primary serving cell.

36. The RNC of claim 35, further comprising:

means for continuing to receive data from the new primary serving cell that was previously queued at a Node B corresponding to the former secondary serving cell; and means for continuing to receive data from the new secondary serving cell that was previously queued at the Node B corresponding to the former primary serving cell.

37. A processing system comprising:

at least one processor, and a memory coupled to the at least one processor, wherein the at least one processor is configured for use in a User Equipment (UE) that is configured with a Multi-Point High Speed Data Packet Access (HSDPA) mode utilizing a primary serving cell and a secondary serving cell, the at least one processor further configured to:

receive Multi-Point HSDPA data from a first cell as the primary serving cell and a second cell as the secondary serving cell;

determine that a measurement of the secondary serving cell exceeds a measurement of the primary serving cell;

transmit a request corresponding to the measurement of the secondary serving cell;

receive a Radio Resource Control (RRC) message in response to the request, wherein the RRC message includes an information element configured to inform the UE that the secondary serving cell utilizes the same carrier frequency as that of the primary serving cell;

transmit a response to the RRC message to confirm completion of a reconfiguration in accordance with the RRC message; and receive Multi-Point HSDPA data from the second cell as the primary serving cell and the first cell as the secondary serving cell in response to the reconfiguration.

38. The at least one processor of claim 37, wherein the reconfiguration comprises a switching on of the Multi-Point HSDPA mode to receive downlink data from the primary serving cell and the secondary serving cell.

39. The processing system of claim 37, wherein the at least one processor is further configured to:

receive HSPDA data from the first cell;

determine that a measurement of the second cell is above a threshold;

transmit a request corresponding to the measurement; and receive Multi-Point HSDPA data from the first cell as the primary serving cell and the second cell as the secondary serving cell.

40. The processing system of claim 39, wherein the reconfiguration comprises a switching on of the Multi-Point HSDPA mode, and wherein the request corresponding to the measurement comprises an indication of Event 1A.

41. The processing system of claim 37, wherein the reconfiguration comprises a swapping of the primary serving cell with the secondary serving cell.

42. The processing system of claim 37, wherein the reconfiguration comprises a swapping of the primary serving cell with the secondary serving cell; and wherein the request corresponding to the measurement comprises an indication of Event 1D.

43. The processing system of claim 37, wherein the at least one processor is further configured to:

transmit an RRC Connection Request message including an information element indicating support for the Multi-Point HSDPA mode.

44. The processing system of claim 37, wherein the at least one processor is further configured to:

utilize an identifier to indicate support for Multi-Point HSDPA, wherein the identifier comprises one of an International Mobile Subscriber Identity (IMSI) or a Packet Temporary Mobile Subscriber Identity (P-TMSI).

45. A processing system comprising:

at least one processor, and a memory coupled to the at least one processor, wherein the at least one processor is configured to:

receive Multi-Point High Speed Data Packet Access (HSDPA) data from a primary serving cell and a secondary serving cell;

determine that a measurement of the secondary serving cell has fallen below a threshold; transmit a request corresponding to the measurement of the secondary serving cell;

receive an Radio Resource Control (RRC) message that excludes a downlink secondary cell information element in response to transmitting the request; and switch off a Multi-Point HSDPA mode such that an High Speed-Downlink Shared Channel (DS-DSCH) is not received from the secondary serving cell.

46. The processing system of claim 45, wherein the at least one processor is further configured to:

remove a cell corresponding to the secondary serving cell from an Active Set.

47. The processing system of claim 45, wherein the request corresponding to the measurement comprises an indication of Event 1B.

48. The processing system of claim 45, wherein the at least one processor is further configured to:

transmit an RRC Connection Request message including an information element indicating support for the Multi-Point HSDPA mode.

49. The processing system of claim 45, wherein the at least one processor is further configured to:
utilize an identifier to indicate support for Multi-Point HSDPA, wherein the identifier comprises one of an International Mobile Subscriber Identity (IMSI) or a Packet Temporary Mobile Subscriber Identity (P-TMSI).

50. A processing system comprising:
at least one processor, and
a memory coupled to the at least one processor,
wherein the at least one processor is configured for a Radio Network Controller (RNC) that is configured to support a Multi-Point High Speed Data Packet Access (HSDPA) mode utilizing a primary serving cell and a secondary serving cell, the at least one processor further configured to:
transmit Multi-Point HSDPA data from a first cell as the primary serving cell and a second cell as the secondary serving cell;
receive a request corresponding to a measurement of the secondary serving cell exceeding a measurement of the primary serving cell;
transmit a Radio Resource Control (RRC) message in response to the request, wherein the RRC message includes an information element configured to inform a UE that the secondary serving cell utilizes the same carrier frequency as that of the primary serving cell;
receive a response to the RRC message to confirm completion of a reconfiguration in accordance with the RRC message; and
transmit Multi-Point HSDPA data from the second cell as the primary serving cell and the first cell as the secondary serving cell in response to the reconfiguration.

51. The processing system of claim 50, wherein the reconfiguration comprises:
reconfiguring a second radio link corresponding to a second Node B to set up the second radio link corresponding to the second Node B as the secondary serving cell in the Multi-Point HSDPA mode; and
reconfiguring a first radio link corresponding to a first Node B corresponding to a serving cell, to set up the first radio link corresponding to the first Node B as the primary serving cell in the Multi-Point HSDPA mode.

52. The processing system of claim 50, wherein the reconfiguration comprises a switching on of the Multi-Point HSDPA mode to transmit downlink data by way of the primary serving cell and the secondary serving cell.

53. The processing system of claim 50, wherein the reconfiguration comprises a swapping of the primary serving cell with the secondary serving cell, such that the first cell that acted as a former primary serving cell acts as a new secondary serving cell and the second cell that acted as a former secondary serving cell acts as a new primary serving cell.

54. The processing system of claim 53, wherein the at least one processor is further configured to:
continue to receive data from the new primary serving cell that was previously queued at a Node B corresponding to the former secondary serving cell; and
continue to receive data from the new secondary serving cell that was previously queued at the Node B corresponding to the former primary serving cell.

55. A computer program product, comprising:
a non-transitory computer-readable medium configured for a User Equipment (UE) configured with a Multi-Point High Speed Data Packet Access (HSDPA) mode utilizing a primary serving cell and a secondary serving cell, the computer-readable medium comprising:
code for causing a computer to receive Multi-Point HSDPA data from a first cell as the primary serving cell and a second cell as the secondary serving cell;
code for causing the computer to determine that a measurement of the secondary serving cell exceeds a measurement of the primary serving cell;
code for causing the computer to transmit a request corresponding to the measurement of the secondary serving cell;
code for causing the computer to receive a Radio Resource Control (RRC) message in response to the request, wherein the RRC message includes an information element configured to inform the UE that the secondary serving cell utilizes the same carrier frequency as that of the primary serving cell;
code for causing the computer to transmit a response to the RRC message to confirm completion of a reconfiguration in accordance with the RRC message; and
code for causing the computer to receive Multi-Point HSDPA data from the second cell as the primary serving cell and the first cell as the secondary serving cell in response to the reconfiguration.

56. The computer program product of claim 55, wherein the reconfiguration comprises a switching on of the Multi-Point HSDPA mode to receive downlink data from the primary serving cell and the secondary serving cell.

57. The computer program product of claim 55, wherein the computer-readable medium further comprises:
code for causing the computer to receive HSDPA data from the first cell;
code for causing the computer to determine that a measurement of the second cell is above a threshold;
code for causing the computer to transmit a request corresponding to the measurement; and
code for causing the computer to receive Multi-Point HSDPA data from the first cell as the primary serving cell and the second cell as the secondary serving cell.

58. The computer program product of claim 57, wherein the reconfiguration comprises a switching on of the Multi-Point HSDPA mode, and
wherein the request corresponding to the measurement comprises an indication of Event 1A.

59. The computer program product of claim 55, wherein the reconfiguration comprises a swapping of the primary serving cell with the secondary serving cell.

60. The computer program product of claim 55, wherein the reconfiguration comprises a swapping of the primary serving cell with the secondary serving cell; and
wherein the request corresponding to the measurement comprises an indication of Event 1D.

61. The computer program product of claim 55, wherein the computer-readable medium further comprises:
code for causing the computer to transmit an RRC Connection Request message including an information element indicating support for the Multi-Point HSDPA mode.

62. The computer program product of claim 55, wherein the computer-readable medium further comprises:
code for causing the computer to utilize an identifier to indicate support for Multi-Point HSDPA, wherein the identifier comprises one of an International Mobile Subscriber Identity (IMSI) or a Packet Temporary Mobile Subscriber Identity (P-TMSI).

63. A computer program product, comprising:
a non-transitory computer-readable medium comprising:
code for causing a computer to receive Multi-Point High Speed Data Packet Access (HSDPA) data from a primary serving cell and a secondary serving cell;
code for causing the computer to determine that a measurement of the secondary serving cell has fallen below a threshold;
code for causing the computer to transmit a request corresponding to the measurement of the secondary serving cell;
code for causing the computer to receive an Radio Resource Control (RRC) message that excludes a downlink secondary cell information element in response to transmitting the request; and
code for causing the computer to switch off a Multi-Point HSDPA mode such that an High Speed-Downlink Shared Channel (DS-DSCH) is not received from the secondary serving cell.

64. The computer program product of claim 63, wherein the computer-readable medium further comprises:
code for causing the computer to remove a cell corresponding to the secondary serving cell from an Active Set.

65. The computer program product of claim 63, wherein the request corresponding to the measurement comprises an indication of Event 1B.

66. The computer program product of claim 63, wherein the computer-readable medium further comprises:
code for causing the computer to transmit an RRC Connection Request message including an information element indicating support for the Multi-Point HSDPA mode.

67. The computer program product of claim 63, wherein the computer-readable medium further comprises:
code for causing the computer to utilize an identifier to indicate support for Multi-Point HSDPA, wherein the identifier comprises one of an International Mobile Subscriber Identity (IMSI) or a Packet Temporary Mobile Subscriber Identity (P-TMSI).

68. A computer program product, comprising:
a non-transitory computer-readable medium configured for a Radio Network Controller (RNC) that is configured to support a Multi-Point High Speed Data Packet Access (HSDPA) mode utilizing a primary serving cell and a secondary serving cell, the computer-readable medium comprising:
code for causing a computer to transmit Multi-Point HSDPA data from a first cell as the primary serving cell and a second cell as the secondary serving cell;
code for causing the computer to receive a request corresponding to a measurement of the secondary serving cell exceeding a measurement of the primary serving cell;
code for causing the computer to transmit a Radio Resource Control (RRC) message in response to the request, wherein the RRC message includes an information element configured to inform a UE that the secondary serving cell utilizes the same carrier frequency as that of the primary serving cell;
code for causing the computer to receive a response to the RRC message to confirm completion of a reconfiguration in accordance with the RRC message; and
code for causing the computer to transmit Multi-Point HSDPA data from the second cell as the primary serving cell and the first cell as the secondary serving cell in response to the reconfiguration.

69. The computer program product of claim 68, wherein the reconfiguration comprises:
code for causing the computer to reconfigure a second radio link corresponding to a second Node B to set up the second radio link corresponding to the second Node B as the secondary serving cell in the Multi-Point HSDPA mode; and
code for causing the computer to reconfigure a first radio link corresponding to a first Node B corresponding to a serving cell, to set up the first radio link corresponding to the first Node B as the primary serving cell in the Multi-Point HSDPA mode.

70. The computer program product of claim 68, wherein the reconfiguration comprises a switching on of the Multi-Point HSDPA mode to transmit downlink data by way of the primary serving cell and the secondary serving cell.

71. The computer program product of claim 68, wherein the reconfiguration comprises a swapping of the primary serving cell with the secondary serving cell, such that the first cell that acted as a former primary serving cell acts as a new secondary serving cell and the second cell that acted as a former secondary serving cell acts as a new primary serving cell.

72. The computer program product of claim 71, wherein the computer-readable medium further comprises:
code for causing the computer to continue to receive data from the new primary serving cell that was previously queued at a Node B corresponding to the former secondary serving cell; and
code for causing the computer to continue to receive data from the new secondary serving cell that was previously queued at the Node B corresponding to the former primary serving cell.

* * * * *